US008767873B2

(12) United States Patent
Baik et al.

(10) Patent No.: US 8,767,873 B2
(45) Date of Patent: Jul. 1, 2014

(54) SYSTEMS AND METHODS FOR COMMUNICATION OVER A PLURALITY OF FREQUENCIES AND STREAMS

(71) Applicant: QUALCOMM Incorporated, San Diego, CA (US)

(72) Inventors: Eugene J. Baik, San Diego, CA (US); Sameer Vermani, San Diego, CA (US); Lin Yang, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 13/690,497

(22) Filed: Nov. 30, 2012

(65) Prior Publication Data
US 2013/0142276 A1 Jun. 6, 2013

Related U.S. Application Data

(60) Provisional application No. 61/566,583, filed on Dec. 2, 2011, provisional application No. 61/569,455, filed on Dec. 12, 2011, provisional application No. 61/592,560, filed on Jan. 30, 2012, provisional application No. 61/598,187, filed on Feb. 13, 2012, provisional application No. 61/621,880, filed on Apr. 9, 2012, provisional application No. 61/624,866, filed on Apr. 16, 2012.

(51) Int. Cl.
H04L 27/00 (2006.01)
(52) U.S. Cl.
USPC .......................................................... 375/299
(58) Field of Classification Search
CPC ..................................................... H04B 7/0671

USPC .......................................................... 375/299
See application file for complete search history.

(56) References Cited

U.S. PATENT DOCUMENTS 8,243,678 B2 * 8/2012 Cudak et al. ................... 370/330
2008/0132282 A1   6/2008 Liu et al.
(Continued)

FOREIGN PATENT DOCUMENTS

WO    2011031058 A2   3/2011

OTHER PUBLICATIONS

IEEE 802.11n-2009, "IEEE Standard for Information technology—Telecommunications and information exchange between systems—Local and metropolitan area networks—Specific requirements", Part 11: Wireless LAN Medium Access Control (MAC) and Physical Layer (PHY) Specifications, Amendment 5: Enhancements for Higher Throughput, IEEE Standard, IEEE, Piscataway, NJ, USA, Oct. 29, 2009, pp. C1-502, XP01760244.

(Continued)

Primary Examiner — Erin File
(74) Attorney, Agent, or Firm — James K. O'Hare

(57) ABSTRACT

Methods and devices for communicating in a communication system are described herein. One aspect of the subject matter described in the disclosure provides a method of communicating over one or more space-time streams. The method includes transmitting a precoded portion of a first stream with a bandwidth of 1 MHz or less. The method further includes transmitting, when there are at least two streams, a precoded portion of a second stream with a cyclic shift delay, relative to the first stream, of 4 μs. The method further includes transmitting, when there are at least three streams, a precoded portion of a third stream with a cyclic shift delay, relative to the first stream, of 1 μs. The method further includes transmitting, when there are at least four streams, a precoded portion of a fourth stream with a cyclic shift delay, relative to the first stream, of 5 μs.

32 Claims, 23 Drawing Sheets

(56) References Cited

U.S. PATENT DOCUMENTS

| | | |
|---|---|---|
| 2008/0247364 A1 | 10/2008 | Kim et al. |
| 2010/0266060 A1 | 10/2010 | Kimura et al. |
| 2011/0142003 A1* | 6/2011 | Kuchi et al. ............. 370/330 |
| 2011/0299625 A1* | 12/2011 | Hooli et al. .............. 375/295 |
| 2012/0051454 A1 | 3/2012 | Zheng et al. |
| 2012/0051476 A1* | 3/2012 | Shi et al. ............... 375/359 |
| 2012/0127940 A1* | 5/2012 | Lee et al. ............... 370/329 |
| 2012/0213114 A1 | 8/2012 | Chen et al. |
| 2012/0213144 A1 | 8/2012 | Zhang et al. |
| 2012/0281774 A1* | 11/2012 | Lee et al. ............... 375/260 |
| 2013/0100914 A1* | 4/2013 | Nakamura et al. ........ 370/329 |
| 2013/0142275 A1 | 6/2013 | Baik et al. |
| 2013/0188630 A1* | 7/2013 | Song et al. ............. 370/338 |

OTHER PUBLICATIONS

International Search Report and Written Opinion—PCT/US2012/067621—ISA/EPO—Feb. 28, 2013.

* cited by examiner

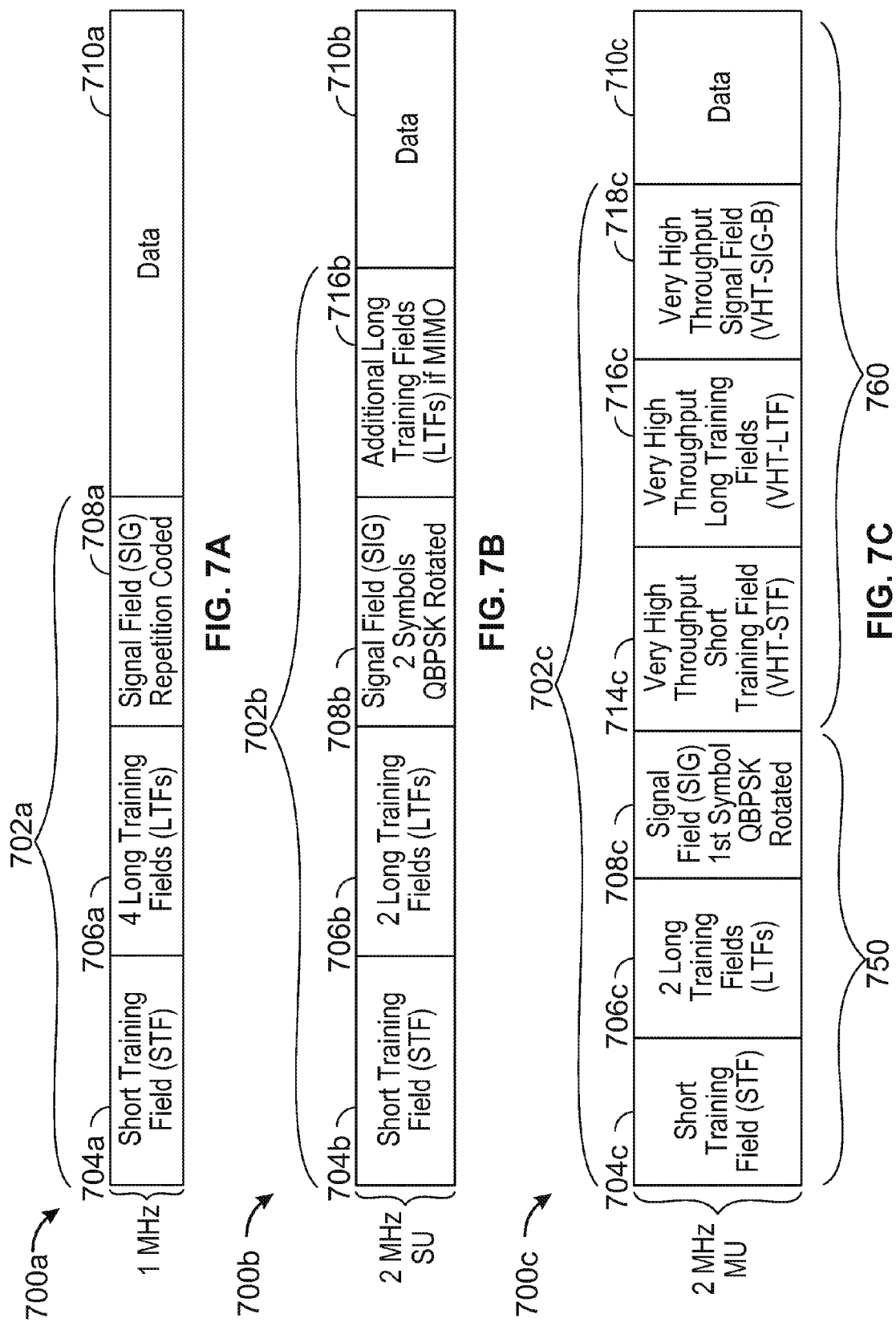

| T_cs(n) for 2MHz SS PPDU and MS PPDU (Precoded portion) | | | | |
|---|---|---|---|---|
| Total number of space-time streams | Cyclic shift (for space-time stream n) (µs) | | | |
| | 1 | 2 | 3 | 4 |
| 1 | 0 | - | - | - |
| 2 | 0 | -4 | - | - |
| 3 | 0 | -4 | -2 | - |
| 4 | 0 | -4 | -2 | -6 |

FIG. 8A

| T_cs(n) for 2MHz SS PPDU and MS PPDU (Precoded portion) | | | | |
|---|---|---|---|---|
| Total number of space-time streams | Cyclic shift (for space-time stream n) (µs) | | | |
| | 1 | 2 | 3 | 4 |
| 1 | 0 | - | - | - |
| 2 | 0 | -2 | - | - |
| 3 | 0 | -2 | -1 | - |
| 4 | 0 | -2 | -1 | -3 |

FIG. 8B

| T_cs(n) for 2MHz SS PPDU and MS PPDU (Precoded portion) | | | | |
|---|---|---|---|---|
| Total number of space-time streams | Cyclic shift (for space-time stream n) (µs) | | | |
| | 1 | 2 | 3 | 4 |
| 1 | 0 | - | - | - |
| 2 | 0 | -5 | - | - |
| 3 | 0 | -5 | -3 | - |
| 4 | 0 | -5 | -3 | -7 |

FIG. 8C

| T_cs(n) for 2MHz SS PPDU and MS PPDU (Precoded portion) | | | | |
|---|---|---|---|---|
| Total number of space-time streams | Cyclic shift (for space-time stream n) (µs) | | | |
| | 1 | 2 | 3 | 4 |
| 1 | 0 | - | - | - |
| 2 | 0 | -3 | - | - |
| 3 | 0 | -3 | -5 | - |
| 4 | 0 | -3 | -5 | -7 |

FIG. 8D

| T_cs(n) for 2MHz SS PPDU and MS PPDU (Precoded portion) | | | | |
|---|---|---|---|---|
| Total number of space-time streams | Cyclic shift (for space-time stream n) (µs) | | | |
| | 1 | 2 | 3 | 4 |
| 1 | 0 | - | - | - |
| 2 | 0 | -3 | - | - |
| 3 | 0 | -3 | -5 | - |
| 4 | 0 | -3 | -5 | -1 |

FIG. 8E

| T_cs(n) for 2MHz MS PPDU (Omni portion) | | | | |
|---|---|---|---|---|
| Total number of space-time streams | Cyclic shift (for space-time stream n) (µs) | | | |
| | 1 | 2 | 3 | 4 |
| 1 | 0 | - | - | - |
| 2 | 0 | -4 | - | - |
| 3 | 0 | -4 | -2 | - |
| 4 | 0 | -4 | -2 | -6 |

FIG. 9A

| T_cs(n) for 2MHz MS PPDU (Omni portion) | | | | |
|---|---|---|---|---|
| Total number of space-time streams | Cyclic shift (for space-time stream n) (µs) | | | |
| | 1 | 2 | 3 | 4 |
| 1 | 0 | - | - | - |
| 2 | 0 | -3 | - | - |
| 3 | 0 | -3 | -5 | - |
| 4 | 0 | -3 | -5 | -1 |

FIG. 9B

| T_cs(n) for 1MHz SS PPDU | | | | |
|---|---|---|---|---|
| Total number of space-time streams | Cyclic shift (for space-time stream n) (µs) | | | |
| | 1 | 2 | 3 | 4 |
| 1 | 0 | - | - | - |
| 2 | 0 | -4 | - | - |
| 3 | 0 | -4 | -2 | - |
| 4 | 0 | -4 | -2 | -6 |

FIG. 10A

| T_cs(n) for 1MHz SS PPDU | | | | |
|---|---|---|---|---|
| Total number of space-time streams | Cyclic shift (for space-time stream n) (µs) | | | |
| | 1 | 2 | 3 | 4 |
| 1 | 0 | - | - | - |
| 2 | 0 | -4 | - | - |
| 3 | 0 | -4 | -6 | - |
| 4 | 0 | -4 | -6 | -2 |

FIG. 10B

| T_cs(n) for 1MHz SS PPDU | | | | |
|---|---|---|---|---|
| Total number of space-time streams | Cyclic shift (for space-time stream n) (µs) | | | |
| | 1 | 2 | 3 | 4 |
| 1 | 0 | - | - | - |
| 2 | 0 | -2 | - | - |
| 3 | 0 | -2 | -4 | - |
| 4 | 0 | -2 | -4 | -6 |

FIG. 10C

| T_cs(n) for 1MHz SS PDU |||||
|---|---|---|---|---|
| Total number of space-time streams | Cyclic shift (for space-time stream n) (μs) ||||
| | 1 | 2 | 3 | 4 |
| 1 | 0 | - | - | - |
| 2 | 0 | -2 | - | - |
| 3 | 0 | -2 | -6 | - |
| 4 | 0 | -2 | -6 | -4 |

FIG. 10D

| T_cs(n) for 1MHz SS PDU |||||
|---|---|---|---|---|
| Total number of space-time streams | Cyclic shift (for space-time stream n) (μs) ||||
| | 1 | 2 | 3 | 4 |
| 1 | 0 | - | - | - |
| 2 | 0 | -6 | - | - |
| 3 | 0 | -6 | -2 | - |
| 4 | 0 | -6 | -2 | -4 |

FIG. 10E

| T_cs(n) for 1MHz SS PDU |||||
|---|---|---|---|---|
| Total number of space-time streams | Cyclic shift (for space-time stream n) (μs) ||||
| | 1 | 2 | 3 | 4 |
| 1 | 0 | - | - | - |
| 2 | 0 | -6 | - | - |
| 3 | 0 | -6 | -4 | - |
| 4 | 0 | -6 | -4 | -2 |

FIG. 10F

| T_cs(n) for 1MHz SS PPDU ||||| 
|---|---|---|---|---|
| Total number of space-time streams | Cyclic shift (for space-time stream n) (µs) ||||
| | 1 | 2 | 3 | 4 |
| 1 | 0 | - | - | - |
| 2 | 0 | -3 | - | - |
| 3 | 0 | -2 | -6 | - |
| 4 | 0 | -2 | -3 | -7 |

FIG. 10G

| T_cs(n) for 1MHz SS PPDU |||||
|---|---|---|---|---|
| Total number of space-time streams | Cyclic shift (for space-time stream n) (µs) ||||
| | 1 | 2 | 3 | 4 |
| 1 | 0 | - | - | - |
| 2 | 0 | -3 | - | - |
| 3 | 0 | -2 | -6 | - |
| 4 | 0 | -4 | -5 | -7 |

FIG. 10H

| T_cs(n) for 1MHz SS PPDU |||||
|---|---|---|---|---|
| Total number of space-time streams | Cyclic shift (for space-time stream n) (µs) ||||
| | 1 | 2 | 3 | 4 |
| 1 | 0 | - | - | - |
| 2 | 0 | -3 | - | - |
| 3 | 0 | -2 | -5 | - |
| 4 | 0 | -2 | -3 | -7 |

FIG. 10I

| T_cs(n) for 1MHz SS PPDU | | | | |
|---|---|---|---|---|
| Total number of space-time streams | Cyclic shift (for space-time stream n) (μs) | | | |
| | 1 | 2 | 3 | 4 |
| 1 | 0 | - | - | - |
| 2 | 0 | -3 | - | - |
| 3 | 0 | -2 | -5 | - |
| 4 | 0 | -4 | -5 | -7 |

FIG. 10J

| T_cs(n) for 1MHz SS PPDU | | | | |
|---|---|---|---|---|
| Total number of space-time streams | Cyclic shift (for space-time stream n) (μs) | | | |
| | 1 | 2 | 3 | 4 |
| 1 | 0 | - | - | - |
| 2 | 0 | -3 | - | - |
| 3 | 0 | -3 | -7 | - |
| 4 | 0 | -3 | -7 | -2 |

FIG. 10K

| T_cs(n) for 1MHz SS PPDU | | | | |
|---|---|---|---|---|
| Total number of space-time streams | Cyclic shift (for space-time stream n) (μs) | | | |
| | 1 | 2 | 3 | 4 |
| 1 | 0 | - | - | - |
| 2 | 0 | -5 | - | - |
| 3 | 0 | -5 | -1 | - |
| 4 | 0 | -5 | -1 | -4 |

FIG. 10L

| T_cs(n) for 1MHz SS PPDU | | | | |
|---|---|---|---|---|
| Total number of space-time streams | Cyclic shift (for space-time stream n) (μs) | | | |
| | 1 | 2 | 3 | 4 |
| 1 | 0 | - | - | - |
| 2 | 0 | -7 | - | - |
| 3 | 0 | -7 | -3 | - |
| 4 | 0 | -7 | -3 | -4 |

FIG. 10M

| T_cs(n) for 1MHz SS PPDU | | | | |
|---|---|---|---|---|
| Total number of space-time streams | Cyclic shift (for space-time stream n) (μs) | | | |
| | 1 | 2 | 3 | 4 |
| 1 | 0 | - | - | - |
| 2 | 0 | -5 | - | - |
| 3 | 0 | -5 | -1 | - |
| 4 | 0 | -4 | -6 | -7 |

FIG. 10N

| T_cs(n) for 1MHz SS PPDU | | | | |
|---|---|---|---|---|
| Total number of space-time streams | Cyclic shift (for space-time stream n) (μs) | | | |
| | 1 | 2 | 3 | 4 |
| 1 | 0 | - | - | - |
| 2 | 0 | -4 | - | - |
| 3 | 0 | -4 | -1 | - |
| 4 | 0 | -4 | -1 | -5 |

FIG. 10O

SYSTEMS AND METHODS FOR COMMUNICATION OVER A PLURALITY OF FREQUENCIES AND STREAMS

CROSS-REFERENCE TO RELATED APPLICATIONS

The present application claims priority to U.S. Provisional Application No. 61/566,583, filed Dec. 2, 2011; U.S. Provisional Application No. 61/569,455, filed Dec. 12, 2011; U.S. Provisional Application No. 61/592,560, filed Jan. 30, 2012; U.S. Provisional Application No. 61/598,187, filed Feb. 13, 2012; U.S. Provisional Application No. 61/621,880, filed Apr. 9, 2012; and U.S. Provisional Application No. 61/624,866, filed Apr. 16, 2012; all of which are hereby incorporated by reference herein.

BACKGROUND

1. Field

Certain aspects of the present disclosure generally relate to wireless communications and, more particularly, to a method for communicating over a plurality of frequencies, or tones, and spatial streams.

2. Background

In order to address the issue of increasing bandwidth requirements demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different user terminals, both in the uplink and downlink direction. Many challenges are present in such systems. For example, delay spread in a wireless channel can cause intersymbol interference (ISI) and inter-carrier interference (ICI). Thus, devices and methods for reducing interference and unintentional beam-forming are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include reducing interference and unintentional beam-forming.

One aspect of the subject matter described in the disclosure provides a method of communicating over one or more space-time streams. The method includes transmitting a precoded portion of a first stream with a bandwidth of 1 MHz or less. The method further includes transmitting, when there are at least two streams, a precoded portion of a second stream with a cyclic shift delay, relative to the first stream, of 4 µs. The method further includes transmitting, when there are at least three streams, the precoded portion of the second stream with a cyclic shift delay, relative to the first stream, of 4 µs, and a precoded portion of a third stream with a cyclic shift delay, relative to the first stream, of 1 µs. The method further includes transmitting, when there are at least four streams, the precoded portion of the second stream with a cyclic shift delay, relative to the first stream, of 4 µs, the precoded portion of the third stream with a cyclic shift delay, relative to the first stream, of 1 µs, and a precoded portion of a fourth stream with a cyclic shift delay, relative to the first stream, of 5 µs.

Another aspect of the subject matter described in the disclosure provides a wireless device configured to communicate over one or more space-time streams. The device includes a processor configured to determine a cyclic shift delay for each space-time stream. The device further includes a memory. The device further includes a transmitter configured to transmit a precoded portion of a first stream with a bandwidth of 1 MHz or less. The transmitter is further configured to transmit, when there are at least two streams, a precoded portion of a second stream with a cyclic shift delay, relative to the first stream, of 4 µs. The transmitter is further configured to transmit, when there are at least three streams, the precoded portion of the second stream with a cyclic shift delay, relative to the first stream, of 4 µs, and a precoded portion of a third stream with a cyclic shift delay, relative to the first stream, of 1 µs. The transmitter is further configured to transmit, when there are at least four streams, the precoded portion of the second stream with a cyclic shift delay, relative to the first stream, of 4 µs, the precoded portion of the third stream with a cyclic shift delay, relative to the first stream, of 1 µs, and a precoded portion of a fourth stream with a cyclic shift delay, relative to the first stream, of 5 µs.

Another aspect of the subject matter described in the disclosure provides an apparatus for communicating over one or more space-time streams. The apparatus includes means for transmitting a precoded portion of a first stream with a bandwidth of 1 MHz or less. The apparatus further includes means for transmitting, when there are at least two streams, a precoded portion of a second stream with a cyclic shift delay, relative to the first stream, of 4 µs. The apparatus further includes means for transmitting, when there are at least three streams, the precoded portion of the second stream with a cyclic shift delay, relative to the first stream, of 4 µs, and a precoded portion of a third stream with a cyclic shift delay, relative to the first stream, of 1 µs. The apparatus further includes means for transmitting, when there are at least four streams, the precoded portion of the second stream with a cyclic shift delay, relative to the first stream, of 4 µs, the precoded portion of the third stream with a cyclic shift delay, relative to the first stream, of 1 µs, and a precoded portion of a fourth stream with a cyclic shift delay, relative to the first stream, of 5 µs.

Another aspect of the subject matter described in the disclosure provides a non-transitory computer-readable medium. The medium includes code that, when executed, causes an apparatus to transmit a precoded portion of a first stream with a bandwidth of 1 MHz or less. The medium further includes code that, when executed, causes the apparatus to transmit, when there are at least two streams, a precoded portion of a second stream with a cyclic shift delay, relative to the first stream, of 4 μs. The medium further includes code that, when executed, causes the apparatus to transmit, when there are at least three streams, the precoded portion of the second stream with a cyclic shift delay, relative to the first stream, of 4 μs, and a precoded portion of a third stream with a cyclic shift delay, relative to the first stream, of 1 μs. The medium further includes code that, when executed, causes the apparatus to transmit, when there are at least four streams, the precoded portion of the second stream with a cyclic shift delay, relative to the first stream, of 4 μs, the precoded portion of the third stream with a cyclic shift delay, relative to the first stream, of 1 μs, and a precoded portion of a fourth stream with a cyclic shift delay, relative to the first stream, of 5 μs.

Another aspect of the subject matter described in the disclosure provides another method of communicating over one or more space-time streams. The method includes transmitting a first stream with a bandwidth of 2 MHz or less. The method further includes transmitting, when there are at least two streams, a second stream with a cyclic shift delay relative to the first stream equal to half a period. The method further includes transmitting, when there are at least three streams, a third stream with a cyclic shift delay relative to one of the first and second stream equal to a quarter of the period. The method further includes transmitting, when there are at least four streams, a fourth stream with a cyclic shift delay relative to the other of the first and second stream equal to a quarter of the period.

Another aspect of the subject matter described in the disclosure provides another a wireless device configured to communicate over one or more space-time streams. The device includes a processor configured to determine a cyclic shift delay for each space-time stream. The device further includes a memory. The device further includes a transmitter configured to transmit a first stream with a bandwidth of 2 MHz or less. The transmitter is further configured to transmit, when there are at least two streams, a second stream with a cyclic shift delay relative to the first stream equal to half a period. The transmitter is further configured to transmit, when there are at least three streams, a third stream with a cyclic shift delay relative to one of the first and second stream equal to a quarter of the period. The transmitter is further configured to transmit, when there are at least four streams, a fourth stream with a cyclic shift delay relative to the other of the first and second stream equal to a quarter of the period.

Another aspect of the subject matter described in the disclosure provides another apparatus for communicating over one or more space-time streams. The apparatus includes means for transmitting a first stream with a bandwidth of 2 MHz or less. The apparatus further includes means for transmitting, when there are at least two streams, a second stream with a cyclic shift delay relative to the first stream equal to half a period. The apparatus further includes means for transmitting, when there are at least three streams, a third stream with a cyclic shift delay relative to one of the first and second stream equal to a quarter of the period. The apparatus further includes means for transmitting, when there are at least four streams, a fourth stream with a cyclic shift delay relative to the other of the first and second stream equal to a quarter of the period.

Another aspect of the subject matter described in the disclosure provides another non-transitory computer-readable medium. The medium includes code that, when executed, causes an apparatus to transmit a first stream with a bandwidth of 2 MHz or less. The medium further includes code that, when executed, causes the apparatus to transmit, when there are at least two streams, a second stream with a cyclic shift delay relative to the first stream equal to half a period. The medium further includes code that, when executed, causes the apparatus to transmit, when there are at least three streams, a third stream with a cyclic shift delay relative to one of the first and second stream equal to a quarter of the period. The medium further includes code that, when executed, causes the apparatus to transmit, when there are at least four streams, a fourth stream with a cyclic shift delay relative to the other of the first and second stream equal to a quarter of the period.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 7A is a block diagram showing an exemplary structure of a preamble and payload of a physical layer packet for transmission over a bandwidth of substantially 1 MHz according to certain implementations.

FIG. 7B is a block diagram showing an exemplary structure of a preamble and payload of a physical layer packet for transmission over a bandwidth of substantially 2 MHz according to a single-segment mode.

FIG. 7C is a block diagram showing an exemplary structure of a preamble and payload of a physical layer packet for transmission over a bandwidth of 2 MHz according to a multi-segment mode.

FIGS. 8A-8E show exemplary cyclic shift delays for a precoded portion of a 2 MHz implementation, according to various embodiments.

FIGS. 9A-9B show exemplary cyclic shift delays for an omni portion of a 2 MHz multi-segment implementation, according to various embodiments.

FIGS. 10A-10O show exemplary cyclic shift delays for a precoded portion of a 1 MHz single-segment implementation, according to various embodiments.

DETAILED DESCRIPTION

Figure 1:
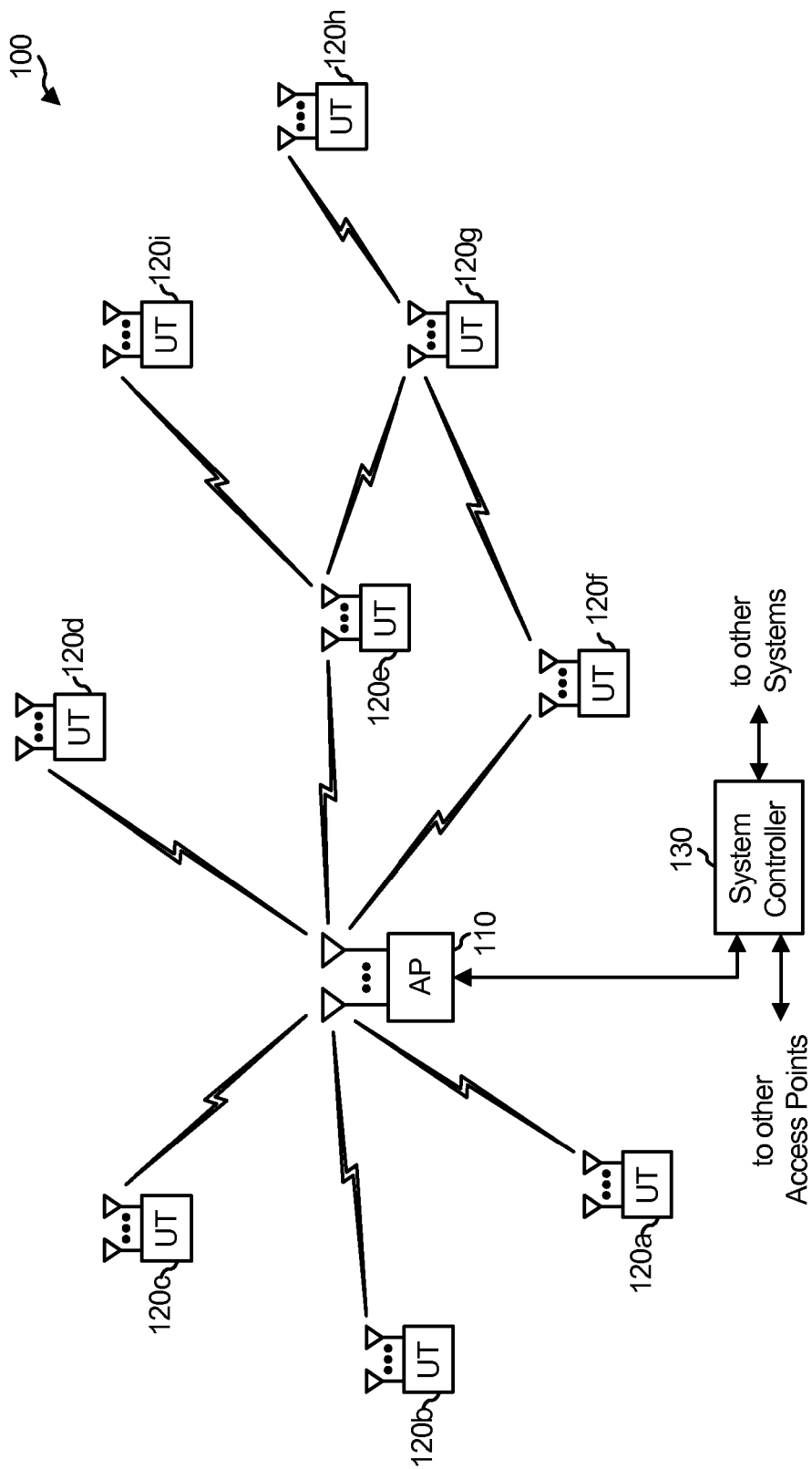
FIG. 1 illustrates a diagram of an aspect of a communications network.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the described aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of aspects. The detailed description and drawings are merely illustrative of the disclosure rather than limiting.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE ($3^{rd}$ Generation Partnership Project Long Term Evolution) or other standards.

Popular wireless network technologies may include various types of wireless local area networks (WLANs). A WLAN may be used to interconnect nearby devices together, employing widely used networking protocols. The various aspects described herein may apply to any communication standard, such as WIFI™ or, more generally, any member of the IEEE 802.11 family of wireless protocols. For example, the various aspects described herein may be used as part of the IEEE 802.11ah protocol, which can use sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as user terminals, or "STAs"). In general, an AP serves as a hub or base user terminal for the WLAN and an STA serves as a user of the WLAN. For example, an STA may be a laptop computer, a personal digital assistant (PDA), a mobile phone, etc. In an example, an STA connects to an AP via a WIFI™ (e.g., IEEE 802.11 protocol such as 802.11ah) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base User terminal Controller ("BSC"), Base Transceiver User terminal ("BTS"), Base User terminal ("BS"), Transceiver Function ("TF"), Radio Router, Radio Transceiver, or some other terminology.

A user terminal ("UT") may also include, be implemented as, or known as an access terminal ("AT"), a subscriber user terminal, a subscriber unit, a mobile user terminal, a remote user terminal, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") user terminal, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as a UT or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 illustrates an aspect of a communications system 100 with access points and user terminals. The system 100 may comprise a multiple-access multiple-input multiple-output (MIMO) system, for example. For simplicity, only one access point 110 is shown in FIG. 1. An access point is generally a fixed user terminal that communicates with the user terminals and may also be referred to as a base user terminal or using some other terminology. A user terminal may be fixed or mobile and may also be referred to as a mobile user terminal or a wireless device, or using some other terminology. The access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. In some embodiments, it may be desirable to have $N_{ap} \geq K \geq 1$ if the data symbol streams for the K user terminals are not multiplexed in code, frequency or time by some means. In some embodiments, K may be greater than $N_{ap}$ if the data symbol streams can be multiplexed using TDMA technique, different code channels with CDMA, disjoint sets of sub-bands with OFDM, and so on. Each selected user terminal may transmit user-specific data to and/or receive user-specific data from the access point. In general, each selected user terminal may be equipped with one or multiple antennas (i.e., $N_{ut} \geq 1$). The K selected user terminals can have the same number of antennas, or one or more user terminals may have a different number of antennas.

The system 100 may be a time division duplex (TDD) system or a frequency division duplex (FDD) system. For a TDD system, the downlink and uplink share the same frequency band. For an FDD system, the downlink and uplink use different frequency bands. The system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, where each time slot may be assigned to a different user terminal 120.

Figure 2:
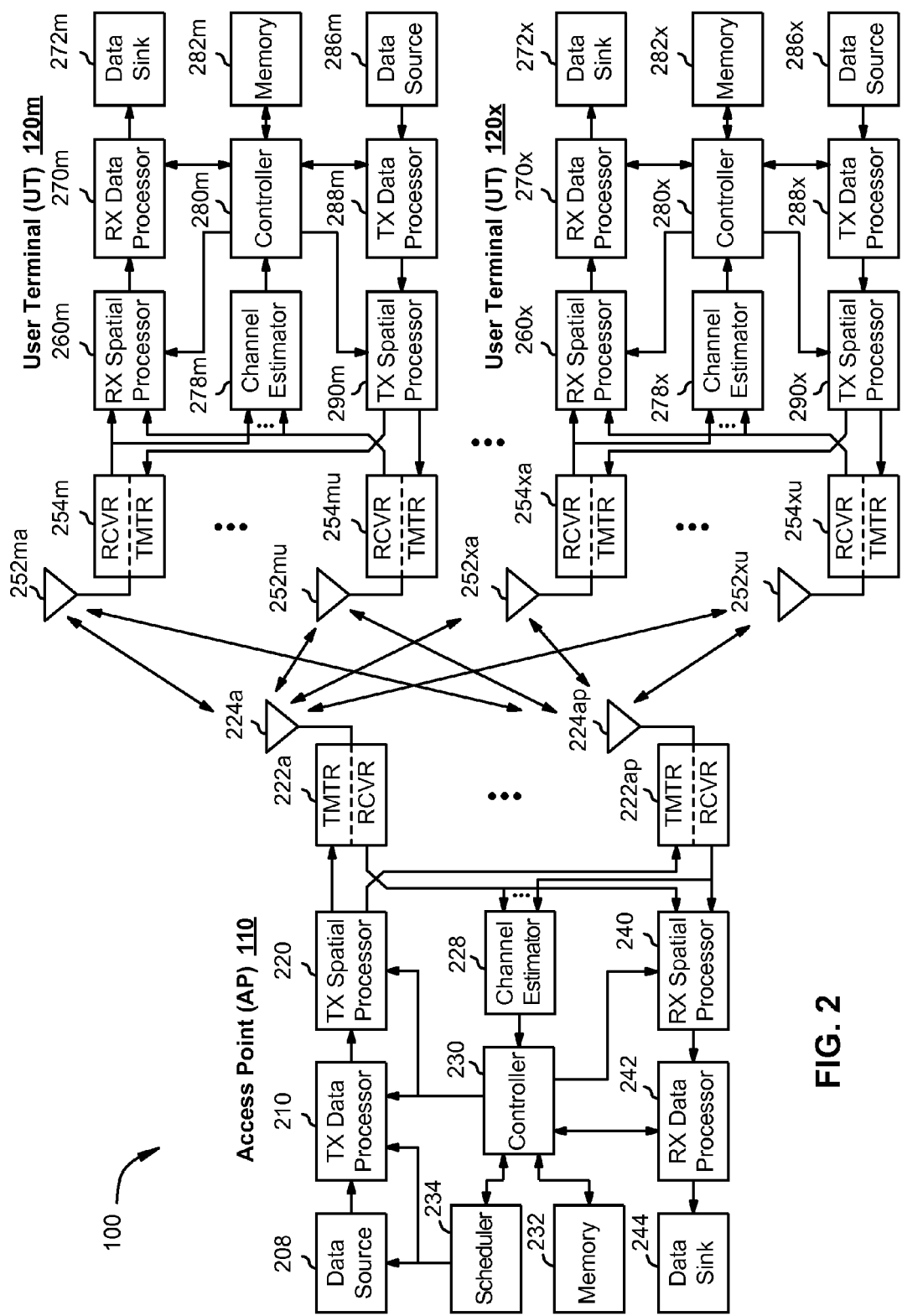
FIG. 2 illustrates a block diagram of an aspect of an access point and user terminals.

FIG. 2 illustrates a block diagram of the access point 110 and two user terminals 120m and 120x in system 100. The access point 110 is equipped with $N_t$ antennas 224a through 224m. The user terminal 120m is equipped with $N_{ut,m}$ antennas 252ma through 252mu, and the user terminal 120x is equipped with $N_{ut,x}$ antennas 252xa through 252xu. The access point 110 is a transmitting entity for the downlink and a receiving entity for the uplink. The user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, and $N_{dn}$ user terminals are selected for simultaneous transmission on the downlink. $N_{up}$, may or may not be equal to $N_{dn}$, and $N_{up}$ and $N_{dn}$ may be static values or may change for each scheduling interval. Beam-steering or some other spatial processing technique may be used at the access point 110 and/or the user terminal 120.

On the uplink, at each user terminal 120 selected for uplink transmission, a TX data processor 288 receives traffic data from a data source 286 and control data from a controller 280. The TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252, for example to transmit to the access point 110.

In some aspects, $N_{up}$ user terminals may be scheduled for simultaneous transmission on the uplink. Each of these user terminals may perform spatial processing on its respective data symbol stream and transmit its respective set of transmit symbol streams on the uplink to the access point 110.

At the access point 110, $N_{ap}$ antennas 224a through 224m receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing may be performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at the access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. The TX data processor 210 provides $N_{dn}$ downlink data symbol streams for the $N_{dn}$ user terminals. A TX spatial processor 220 performs spatial processing (such as a precoding or beamforming) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 may provide $N_{ap}$ downlink signals for transmission from $N_{ap}$ antennas 224, for example to transmit to the user terminals 120.

At each user terminal 120, $N_{ut,m}$ antennas 252 receive the $N_{ap}$ downlink signals from the access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal 120. The receiver spatial processing may be performed in accordance with the CCMI, MMSE, or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. The controller 280 for each user terminal may send feedback information (e.g., the downlink and/or uplink eigenvectors, eigenvalues, SNR estimates, and so on) to the access point 110. The controllers 230 and 280 may also control the operation of various processing units at the access point 110 and user terminal 120, respectively.

Figure 3:
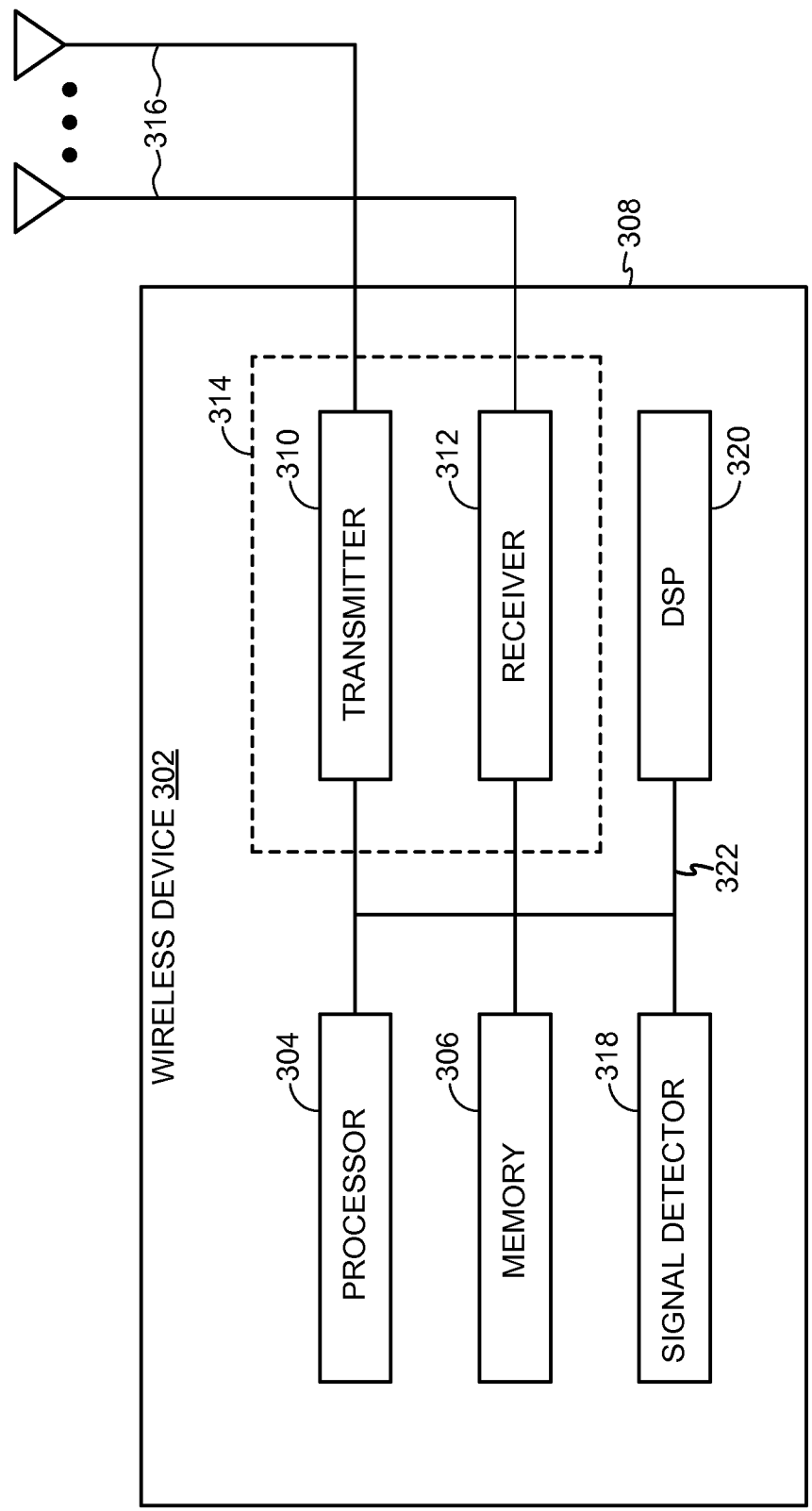
FIG. 3 illustrates a block diagram of an aspect of a wireless device.

FIG. 3 illustrates various components that may be utilized in a wireless device 302 that may be employed within the communication system 100. The wireless device 302 is an example of a device that may be configured to implement the various methods described herein. The wireless device 302 may implement an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 may perform logical and arithmetic operations based on program instructions stored within the memory 306. The instructions in the memory 306 may be executable to implement the methods described herein.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

In some aspects, the system 100 illustrated in FIG. 1 uses OFDM. As described above, a plurality of sub-carriers may be independently modulated with data in an OFDM system. Further, in some aspects of an OFDM system, a plurality of spatial channels may be used to transmit each sub-carrier. In some aspects, the spatial channels are referred to as spatial streams. Each spatial stream may correspond to an antenna of a wireless node and may be transmitted using that antenna, for example. Although certain aspects below will be described with respect to an OFDM system, those of skill in the art will appreciate that other systems may be used and that the system 100 may implement other means or modes of communication.

Certain aspects described herein may be used to interleave or permute symbols prior to transmission. In some aspects, the symbols correspond to a codeword or comprise a subset of the codeword. The symbols may comprise consecutive symbols from the codeword and may be transmitted over non-adjacent tones using a selected spatial stream. The symbols may comprise modulated symbols, for example as mapped by a 32 or 64-QAM mapper, and may be transmitted in a single OFDM symbol. Modulated symbols from other codewords may also be transmitted in the OFDM symbol. In some aspects, the symbols of at least one codeword may be mapped to a tone and a spatial stream for transmission. By mapping, the symbols of the codeword may be spread among the tones and/or spatial streams to provide frequency, time, and/or spatial diversity when transmitting.

Figure 4:
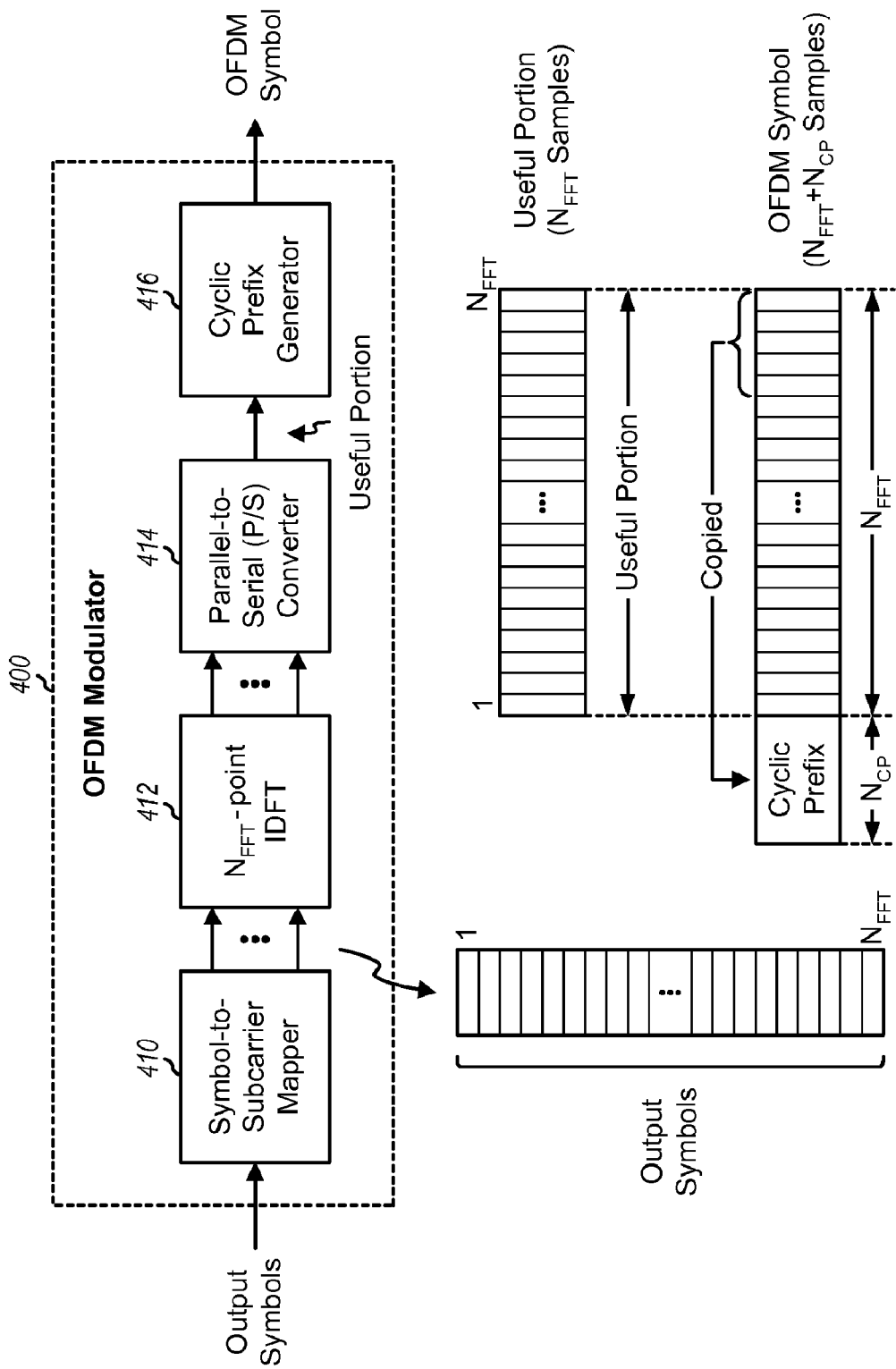
FIG. 4 shows a block diagram of a design of an OFDM modulator.

FIG. 4 shows a block diagram of a design of an OFDM modulator 400. In various embodiments, the OFDM modulator 400 can be included in one or more of the transmitters 222a through 222m and transmitters 254m through 354xu in FIG. 2 or the transmitter 310 in FIG. 3. In some embodiments, the OFDM modulator 400 can be included in one or more of the TX spatial processors 220, 290m, and 290x. In the illustrated embodiment, the OFDM modulator 400, a symbol-to-subcarrier mapper 410 receives and maps output symbols to the $N_{FFT}$ total subcarriers. In each OFDM symbol period, an IFFT 412 transforms $N_{FFT}$ output symbols for the $N_{FFT}$ total subcarriers to the time domain with an $N_{FFT}$-point inverse discrete Fourier transform (IDFT) and provides a useful portion containing $N_{FFT}$ time-domain samples. Each sample can be a complex value to be transmitted in one chip period. A parallel-to-serial (P/S) converter 414 can serialize the $N_{FFT}$ samples in the useful portion. A cyclic prefix generator 416 can copy the last $N_{cp}$ samples of the useful portion and appends these Ncp samples to the front of the useful portion to form an OFDM symbol containing $N_{FFT}+N_{cp}$ samples, where $N_{cp}$ is a cyclic prefix as discussed below. Each OFDM symbol thus contains a useful portion of $N_{FFT}$ samples and a cyclic prefix of $N_{cp}$ samples. The cyclic prefix can be used to reduce intersymbol interference (ISI) and inter-carrier interference (ICI) caused by delay spread in a wireless channel.

For certain embodiments, a cyclic delay diversity (CDD) scheme may be used to transmit the from the base station. Cyclic delay diversity (CDD) may be used to create frequency diversity in a MIMO transmission, which may improve error rate performance. With cyclic delay diversity, the OFDM symbols for each transmit antenna may be cyclically delayed by a different amount, as described below. M different cyclically delayed signals may be transmitted from the M transmit antennas.

In one embodiment of the present disclosure, the cyclic delay $t_m$ for each transmit antenna (except for one transmit antenna with reference cyclic delay of zero) may be selected to be greater than the maximum expected delay spread in the system. The cyclic prefix length $N_{cp}$ may be selected such that it is greater than the maximum expected delay spread in the system. Thus, the cyclic delay for each transmit antenna may be selected to be an integer multiple of the cyclic prefix length.

In some embodiments, the cyclic delay can be implemented in a cyclic shift delay (CSD) module. The CSD module can shift symbols associated with or mapped to interleaved tones by a delay with respect to other symbol streams, for example with respect to a first stream. In some aspects, the CSD modules each receive symbols associated with codewords in respective streams and shift the symbols by a respective delay. In various embodiments, the CSD modules can be integrated into any component of the AP 110 or UT 120.

Figure 5:
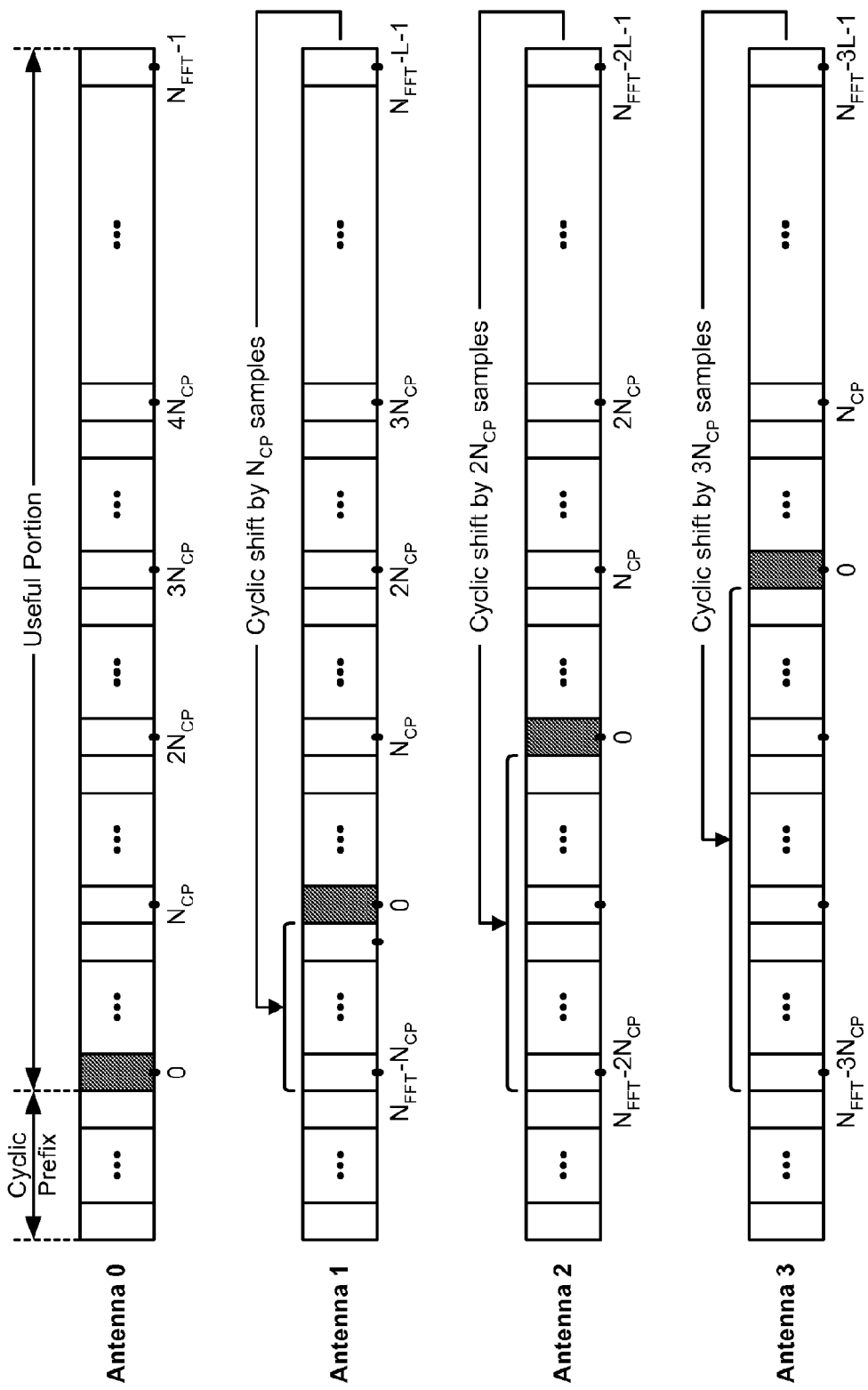
FIG. 5 shows cyclic delay diversity with applied cyclic shifts for an illustrative example of M=4 transmit antennas.

FIG. 5 shows cyclic delay diversity with applied cyclic shifts for an illustrative example of M=4 transmit antennas. Transmit antenna 0 may have a cyclic shift of zero, and useful portion may be cyclically shifted/delayed by zero samples for this transmit antenna. Transmit antenna 1 may have a cyclic shift of $N_{cp}$, and the useful portion may be cyclically shifted by $N_{cp}$ samples for this transmit antenna. Transmit antenna 2 may have a cyclic shift of $2N_{cp}$, and the useful portion may be cyclically shifted by $2N_{cp}$ samples for this transmit antenna. Transmit antenna 3 may have a cyclic shift of $3N_{cp}$, and the useful portion may be cyclically shifted by $3N_{cp}$ samples for this transmit antenna.

As described herein, the AP 110 and the UT 120 can apply different CSD tables to exchanged data units based on the stream bandwidth. For example, one or more of the CSD tables shown in FIGS. 8A-8E and 9A-9B can be applied to 2 MHz streams, and one or more of the CSD tables shown in FIGS. 10A-10O can be applied to 1 MHz streams. In some embodiments, exchanged data units may include control information or data, in the form of physical (PHY) layer packets or physical layer protocol data units (PPDUs). As will be described below with respect to FIGS. 6 and 7A-7C, in certain embodiments, the PPDUs can include one or more frame formats such as, for example, single-segment (SS) and multi-segment (MS) formats. In various embodiments, the single-segment frame format (SSFF) and single-segment mode (SSM) can be referred to as a "single user" frame format and mode, respectively. Moreover, the multi-segment frame format (MSFF) and multiple segment mode (MSM) can be referred to as a "multi-user" frame format and mode, respectively. In various embodiments, the AP 110 and the UT 120 can apply different CSD tables to exchanged data units based on the stream bandwidth and/or the frame format. Moreover, the AP 110 and the UT 120 can apply different CSD tables to different portions of the exchanged data units.

Figure 6:
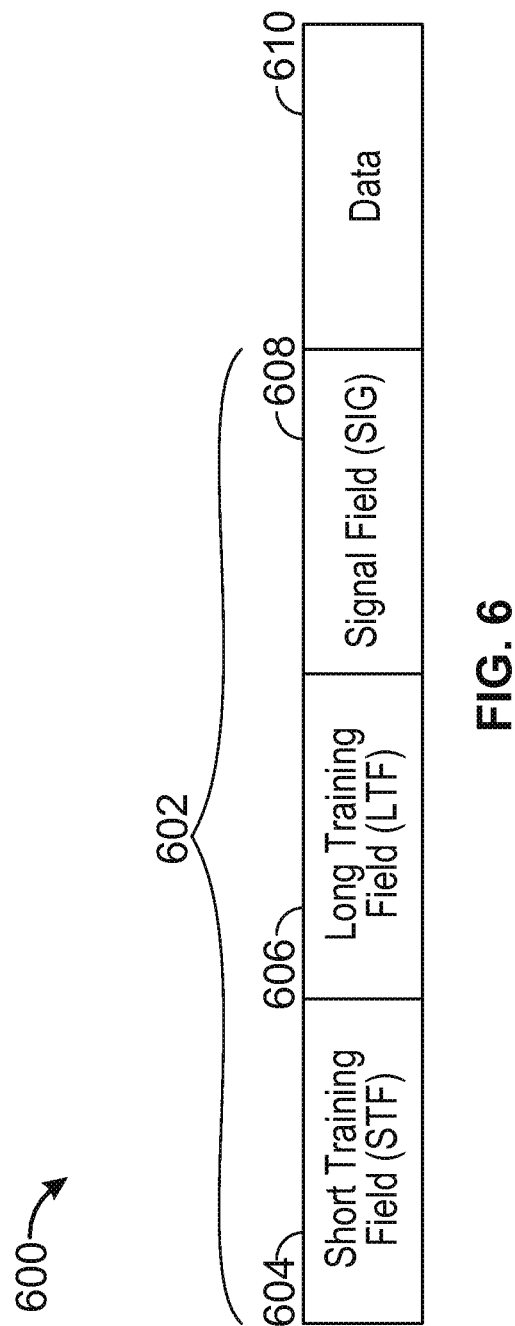
FIG. 6 is a block diagram showing an exemplary structure of a preamble and payload of a physical layer packet.

FIG. 6 is a block diagram showing an exemplary structure of a preamble 602 and payload 610 of a physical layer packet 600. The preamble 602 may include a short training field (STF) 604 that includes an STF sequence of known values. In some aspects, the STF may be used for packet detection (e.g., to detect the start of a packet) and for coarse time/frequency estimation. The STF sequence may be optimized to have a low PAPR and include a subset of non-zero tones with a particular periodicity. The STF 604 may span one or multiple OFDM symbols. The preamble 602 may further include a long training field (LTF) 606 that may span one or multiple OFDM symbols and may include one or more LTF sequences of known non-zero values. The LTF may be used for channel estimation, fine time/frequency estimation, and mode detection. The preamble 602 may further include a signal field (SIG) 608 as described above that may include a number of bits or values used in one aspect for mode detection purposes and determination of transmission parameters.

As described above, certain implementations described herein may be directed to wireless communication systems that may be used for smart metering or in a smart grid network. These wireless communication systems may be used to provide sensor applications or be used in home automation. Wireless devices used in such systems may instead or in addition be used in a healthcare context, for example for personal healthcare. They may also be used for surveillance, to enable extended-range Internet connectivity (e.g., for use with hotspots), or to implement machine-to-machine communications. Accordingly, some implementations may use low data rates such as approximately 150 Kpbs. Implementations may further have increased link budget gains (e.g., around 20 dB) over other wireless communications such as 802.11b. In accordance with low data rates, if wireless nodes are configured for use in a home environment, certain aspects may be directed to implementations with good in-home coverage without power amplification. Furthermore, certain aspects may be directed to single-hop networking without using a MESH protocol. In addition, certain implementations may result in significant outdoor coverage improvement with power amplification over other wireless protocols. Furthermore, certain aspects may be directed to implementations that may accommodate large outdoor delay-spread and reduced sensitivity to Doppler. Certain implementations may achieve similar LO accuracy as traditional WIFI™.

Accordingly, certain implementations are directed to transmitting and receiving wireless signals in sub-gigahertz bands. In one aspect, this may result in a propagation gain of, for example, 14.5 dB (e.g., available due to 900 MHz vs. 2.4 GHz). In another aspect, obstruction loss may be reduced by using sub-gigahertz signal which may result in, for example, a 3 dB gain.

Certain implementations are further directed to sending wireless signals with low bandwidths in sub-gigahertz bands. This may further allow achieving greater link budget gains over other wireless communication systems. For example, in one exemplary implementation, a symbol may be configured to be transmitted or received using a bandwidth of 1 MHz. The wireless device 302 may be configured to operate in one of several modes. In one mode, symbols such as OFDM symbols may be transmitted or received using a bandwidth of 1 MHz. In another mode, symbols may be transmitted or received using a bandwidth of 2 MHz. Additional modes may also be provided for transmitting or receiving symbols using a bandwidth of 4 MHz, 8 MHz, 16 MHz, and the like. The bandwidth may also be referred to as the channel width.

Each mode may use a different number of tones/subcarriers for transmitting the information. For example, in one implementation, a 1 MHz mode (corresponding to transmitting or receiving symbols using a bandwidth of 1 MHz) may use 32 tones. In one aspect, using a 1 MHz mode may provide for a 13 dB noise reduction as compared to a bandwidth such as 20 MHz. In addition, low rate techniques may be used to overcome effects such as frequency diversity losses due to a lower bandwidth which could result in 4-5 dB losses depending on channel conditions. To generate/evaluate symbols sent or received using 32 tones, a transform module 304 or 404 as described above may be configured to use a 32 point mode (e.g., a 32 point IFFT or FFT). The 32 tones may be allocated as data tones, pilot tones, guard tones, and a DC tone. In one implementation, 24 tones may be allocated as data tones, 2 tones may be allocated as pilot tones, five tones may be allocated as guard tones, and 1 tone may be reserved for the DC tone. In this implementation, the symbol duration may be configured to be 40 µs including cyclic prefix.

In addition to a 1 MHz mode, a 2 MHz mode may additionally be available that may be used to transmit and receive symbols using 64 tones. In one implementation, the 64 tones may be allocated as 52 data tones, 4 pilot tones, 1 DC tone, and 13 guard tones. As such, a transform module 304 or 404 may be configured to operate according to a 64 point mode when transmitting or receiving 2 MHz symbols. The symbol duration may also be 40 µs including cyclic prefix. Additional modes with different bandwidths (e.g., 4 MHz, 8 MHz, and 16 MHz) may be provided that may use transform modules 304 or 404 operating in modes of corresponding different sizes (e.g., 128 point FFT, 256 point FFT, 512 point FFT, etc.). In addition, each of the modes described above may be configured additionally according to both a single-segment mode and a multi-segment mode. Wireless signals using bandwidths less than or equal to 2 MHz may provide various advantages for providing wireless nodes that are configured to meet global regulatory constraints over a broad range of bandwidth, power, and channel limitations.

With reference to FIG. 6, when transmitting packets in sub-gigahertz bands with bandwidths as described above, the preamble 602 may be designed to have robust mode detection in an early state of the preamble to detect between different modes. The preamble 602 may further be optimized to minimize overhead and provide adequate coexistence of devices transmitting using the 1 MHz mode and devices transmitting using greater than or equal to 2 MHz modes. The preamble 602 may be designed to have robust mode detection in an early state of the preamble to detect between 1 MHz transmissions (32 pt FFT) and 2 MHz transmissions (64 pt FFT). The physical layer packet 600 may be generated for transmission for different data rates to allow in one aspect for transmission of data over greater distances. For example, the physical layer packet 600 may be generated for a low data rate along with another "normal" data rate as described above.

FIG. 7A is a block diagram showing an exemplary structure of a preamble 702a and payload 710a of a physical layer packet 700a for transmission over a bandwidth of substantially 1 MHz according to certain implementations. The preamble 702a may include a short training field (STF) 704a. The STF 704a may include a sequence of known values with a subset of non-zero values corresponding to a subset of non-zero tones with a particularly chosen periodicity. The periodicity of the non-zero tones may be the same as used for STF sequences used in higher bandwidths such as 2 MHz. In some implementations, the STF field 704a may be boosted, such as by 3 dB, for range extension. In an embodiment, the STF field 704a can be repetition coded, both alone and in conjunction with power boosting. The STF 704a may be sent over four OFDM symbols where each symbol repeats a known STF sequence.

The preamble 702a may further include a long training field (LTF) 706a. The LTF 706a may be formed of four OFDM symbols and may include an LTF sequence transmitted in each symbol. The LTF sequences may be formed of known non-zero values corresponding to non-zero tones for all pilot and data tones. In some implementations, the LTF sequences may therefore include 26 non-zero values.

The preamble 702a may further include a signaling field (SIG) 708a. In some exemplary implementations, the SIG field 708a may be repetition coded. In some implementations, the SIG field 708a may be 2× repetition coded. The physical layer packet 700a may further include the payload 710a that may be generated using 24 tones in each OFDM symbol allocated for data. The preamble 702a may be used for generating either a low rate or a normal rate 1 MHz transmission. The preamble 702a may be used according to a single-segment mode.

FIG. 7B is a block diagram showing an exemplary structure of a preamble 702b and payload 710b of a physical layer packet 700b for transmission over a bandwidth of substantially 2 MHz according to a single-segment mode. The preamble 702b may include a short training field (STF) 704b. The STF 704b may include a sequence of known values with a subset of non-zero values corresponding to a subset of non-zero tones over 64 tones with a determined periodicity. The periodicity of the non-zero tones may be the same as used for STF sequences used for 1 MHz transmissions. The preamble 702b may further include a long training field (LTF) 706b. The LTF 706b may be formed of two OFDM symbols and may include LTF sequences transmitted in each symbol. The LTF sequences may comprise non-zero values corresponding to non-zero tones for all pilot and data tones. The LTF sequences may therefore include 56 non-zero values in some implementations. The preamble 702b may further include a signaling field (SIG) 708b. The SIG field 708b may be formed from two OFDM symbols. The two OFDM symbols of the SIG field 708b may each be QBPSK rotated. If more than one spatial streams are being used, the preamble 702b may include additional long training fields (LTFs) 716b for each of the additional spatial streams being used (e.g., as the LTF 704b may correspond to the first spatial stream if there are more than one). The physical layer packet 700b may further include the payload 710b that may be generated using 52 tones in each OFDM symbol allocated for data. The preamble 702b may be used according to a single-segment mode.

FIG. 7C is a block diagram showing an exemplary structure of a preamble 702c and payload 710c of a physical layer packet 700c for transmission over a bandwidth of 2 MHz according to a multi-segment mode. The preamble 702c may include a short training field (STF) 704c. The STF 704c may include a sequence of known values with a subset of non-zero values corresponding to a subset of non-zero tones over 64 tones with a determined periodicity. The periodicity of the non-zero tones may be the same as used for STF sequences used for 1 MHz transmissions. The preamble 702c may further include a long training field (LTF) 706c. The LTF 706c may be formed of two OFDM symbols and may include LTF sequences transmitted in each symbol. The LTF sequences may comprise non-zero values corresponding to non-zero tones for all pilot and data tones. The LTF sequences may therefore include 56 non-zero values according to some implementations. The preamble 702c may further include a signaling field (SIG) 708c. The SIG field 708c may be formed from two OFDM symbols. The first of the two OFDM symbols of the SIG field 708c may be QBPSK rotated. In one aspect, this allows for the receiver to detect whether the packet 700c is multi-user mode packet or a single-segment mode packet based on whether only one of the SIG field symbols is QBPSK rotated. The preamble 702c may further include a very high throughput short training field (VHT-STF) 714c. The VHT-STF 714c may correspond to a VHT-STF used for IEEE 802.11ac transmissions. The preamble 702c may further include one or more very high throughput long training fields (VHT-LTFs) 716c corresponding to each spatial stream being used. The VHT-LTFs 716c may correspond to VHT-LTFs used for IEEE 802.11ac transmissions. The preamble 702c may further include a very high throughput signal field (VHT-SIG-B) 718c. The VHT-SIG-B 718c may correspond to the VHT-SIG-B used for IEEE 802.11ac transmissions. The physical layer packet 700c may further include the payload 710c that may be generated using 52 tones in each OFDM symbol allocated for data. The preamble 702c may be used according to a multi-segment mode.

In an embodiment, the physical layer packet 700c can be divided into an omni portion 750 and a precoded portion 760. The omni portion 750 can be a single stream transmission of the STF 704c, the LTF 706c, and the SIG field 708c. One or more fields of the omni portion 750 can be replicated up to N_tx identical streams, which can map to N_tx transmit antennas. The precoded portion 760 can carry N_sts unique data streams, and can include the VHT-STF 714c, the VHT-LTFs 716c, the VHT-SIG-B 718c, and the payload 710c for each data stream. Therefore, both the omni portion 750 and the precoded portion 760 can have its own STF section and encoded data payload section. Accordingly, in an embodiment, separate CSD values can be applied be applied to the omni portion 750 and the precoded portions 760. The CSD tables for the precoded portion 760 can be determined according to the methods and criteria described above. The CSD tables for the omni portion 750 can be determined according to the following methods and criteria.

$$\text{Metric}[RxAnt] = \frac{STFPwr[RxAnt]}{DataPwr[RxAnt]} \quad (1)$$

For each number of space-time streams, the CSD combination can be chosen to optimize for the metric across a set of channel models. The channel models can include, for example, D-NLOS (stretched), SCM Urban Macro, and/or "AWGN" (i.e. flat fading w/random phase). Any combination of the channel models can be used. In various embodiments, equal priority can be given to different channels, and equal weight can be given to saturation and quantization costs. In an embodiment, the CSD selection metric can be quantified as: ABS(MIN(5th percentile))+ABS(MAX(95th percentile)), where MAX and MIN look over the channel models being considered, and the metric is sum of dotted RED distances. In another embodiment, the CSD selection metric can be quantified as the distance between the 5th percentile and the 95th percentile points. Either quantification can be applied within a single channel model, or across multiple channel models.

In one embodiment, the selection criteria can select CSD combinations only from candidate CSDs which are multiples of 2 microseconds. In the transmitter 310, the per-stream CSDs may be applied to each subcarrier (in the frequency domain, prior to IFFT) through a phase rotation of the complex symbol. These multiplications may involve sine and/or cosine operations that are easier to implement when the CSD is even for the given STF period (e.g., an 8 µs period for 1 and 2 MHz implementations). In another embodiment, the selection criteria can select CSD combinations for 2 MHz implementations only from a restricted set such as, for example, 0 µs, 2 µs, 4 µs, 6 µs, etc.

In an embodiment, the 2 MHz CSDs can have a granularity of 0.5 µs. By comparison, 1 MHz CSDs can have a granularity of 1 µs. In various embodiments, the CSDs can be picked from values between 0 µs and −7.5 µs (inclusive).

FIG. 8A shows exemplary cyclic shift delays for a precoded portion of a 2 MHz implementation, according to an embodiment. The CSDs shown in FIG. 8A can be applied to both single-segment and multi-segment frames. For each number of space-time streams shown in the first column, FIG. 8A shows the cyclic shift for one of the streams (1-4). Cyclic shifts are shown in µs. Although four streams are shown, any number of streams can be used. The cyclic shift delays shown in FIG. 8A can be implemented by, for example, any of the devices described herein with respect to FIGS. 1-4 such as, for example, the transmitter 222, the TX special processor 220 and/or the cyclic prefix generator 416. Within each row, the values for each active stream can be rearranged without loss of generality. In some embodiments, each space-time stream can be related to a different transmit antenna.

As shown in FIG. 8A, in embodiments where there is one active space-time stream, the stream has no delay. In embodiments where there are two active space-time streams, stream 1 has no delay and stream 2 is delayed by 4 µs. In various embodiments, when there are two streams, the stream delays can be substantially uniformly distributed within the period. The period can be, for example, a symbol period and/or a short training field (STF) period. In the illustrated embodiment, the period is 8 µs.

Referring still to FIG. 8A, in embodiments where there are three active space-time streams, stream 1 has no delay, stream 2 is delayed by 4 µs, and stream 3 is delayed by 2 µs. In an alternative embodiment, stream 3 can be delayed by 6 µs. In various embodiments, when there are three streams, the stream delays can take three out of four substantially uniformly distributed delay values within the period.

Referring still to FIG. 8A, in embodiments where there are four active space-time streams, stream 1 has no delay, stream 2 is delayed by 4 µs, stream 3 is delayed by 2 µs, and stream 4 is delayed by 6 µs. In various embodiments, when there are four streams, the stream delays can be substantially uniformly distributed within the period.

FIG. 8B shows exemplary cyclic shift delays for a precoded portion of a 2 MHz implementation, according to another embodiment. The CSDs shown in FIG. 8B can be applied to both single-segment and multi-segment frames. In an embodiment, the device implementing the delays shown in FIG. 8B can implement a short guard interval (SGI). In embodiments using an SGI, it may be desirable for the cyclic shift delay to be equal to or less than the duration of the SGI. In the example shown in FIG. 8B, the SGI is 4 µs.

For each number of space-time streams shown in the first column, FIG. 8B shows the cyclic shift for one of the streams (1-4). Cyclic shifts are shown in µs. Although four streams are shown, any number of streams can be used. The cyclic shift delays shown in FIG. 8B can be implemented by, for example, any of the devices described herein with respect to FIGS. 1-4 such as, for example, the transmitter 222, the TX special processor 220 and/or the cyclic prefix generator 416. Within each row, the values for each active stream can be rearranged without loss of generality. In some embodiments, each space-time stream can be related to a different transmit antenna.

As shown in FIG. 8B, in embodiments where there is one active space-time stream, the stream has no delay. In embodiments where there are two active space-time streams, stream 1 has no delay and stream 2 is delayed by 2 µs. In various embodiments, when there are two streams, the stream delays can be substantially uniformly distributed within the duration of the SGI. In the illustrated embodiment, the duration of a SGI is 4 µs.

Referring still to FIG. 8B, in embodiments where there are three active space-time streams, stream 1 has no delay, stream 2 is delayed by 2 µs, and stream 3 is delayed by 1 µs. In an alternative embodiment, stream 3 can be delayed by 3 µs. In various embodiments, when there are three streams, the stream delays can take three out of four substantially uniformly distributed delay values within the duration of a SGI.

Referring still to FIG. 8B, in embodiments where there are four active space-time streams, stream 1 has no delay, stream 2 is delayed by 2 µs, stream 3 is delayed by 1 µs, and stream 4 is delayed by 3 µs. In various embodiments, when there are four streams, the stream delays can be substantially uniformly distributed within the duration of the SGI.

FIG. 8C shows exemplary cyclic shift delays for a precoded portion of a 2 MHz implementation, according to another embodiment. The CSDs shown in FIG. 8C can be applied to both single-segment and multi-segment frames. For each number of space-time streams shown in the first column, FIG. 8C shows the cyclic shift for one of the streams (1-4). Cyclic shifts are shown in µs. Although four streams are shown, any number of streams can be used. The cyclic shift delays shown in FIG. 8C can be implemented by, for example, any of the devices described herein with respect to FIGS. 1-4 such as, for example, the transmitter 222, the TX special processor 220 and/or the cyclic prefix generator 416. In some embodiments, each space-time stream can be related to a different transmit antenna.

As shown in FIG. 8C, in embodiments where there is one active space-time stream, the stream has no delay. In embodiments where there are two active space-time streams, stream 1 has no delay and stream 2 is delayed by 5 µs. In embodiments where there are three active space-time streams, stream 1 has no delay, stream 2 is delayed by 5 µs, and stream 3 is delayed by 3 µs. In embodiments where there are four active space-time streams, stream 1 has no delay, stream 2 is delayed by 5 µs, stream 3 is delayed by 3 µs, and stream 4 is delayed by 7 µs.

FIG. 8D shows exemplary cyclic shift delays for a precoded portion of a 2 MHz implementation, according to another embodiment. The CSDs shown in FIG. 8D can be applied to both single-segment and multi-segment frames. For each number of space-time streams shown in the first column, FIG. 8D shows the cyclic shift for one of the streams (1-4). Cyclic shifts are shown in µs. Although four streams are shown, any number of streams can be used. The cyclic shift delays shown in FIG. 8D can be implemented by, for example, any of the devices described herein with respect to FIGS. 1-4 such as, for example, the transmitter 222, the TX special processor 220 and/or the cyclic prefix generator 416. In some embodiments, each space-time stream can be related to a different transmit antenna.

As shown in FIG. 8D, in embodiments where there is one active space-time stream, the stream has no delay. In embodiments where there are two active space-time streams, stream 1 has no delay and stream 2 is delayed by 3 µs. In embodiments where there are three active space-time streams, stream 1 has no delay, stream 2 is delayed by 3 µs, and stream 3 is delayed by 5 µs. In embodiments where there are four active space-time streams, stream 1 has no delay, stream 2 is delayed by 3 µs, stream 3 is delayed by 5 µs, and stream 4 is delayed by 7 µs.

FIG. 8E shows exemplary cyclic shift delays for a precoded portion of a 2 MHz implementation, according to an embodiment. The CSDs shown in FIG. 8E can be applied to both single-segment and multi-segment frames. For each number of space-time streams shown in the first column, FIG. 8E shows the cyclic shift for one of the streams (1-4). Cyclic shifts are shown in µs. Although four streams are shown, any number of streams can be used. The cyclic shift delays shown in FIG. 8E can be implemented by, for example, any of the devices described herein with respect to FIGS. 1-4 such as, for example, the transmitter 222, the TX special processor 220 and/or the cyclic prefix generator 416. In some embodiments, each space-time stream can be related to a different transmit antenna.

As shown in FIG. 8E, in embodiments where there is one active space-time stream, the stream has no delay. In embodiments where there are two active space-time streams, stream 1 has no delay and stream 2 is delayed by 3 µs. In embodiments where there are three active space-time streams, stream 1 has no delay, stream 2 is delayed by 3 µs, and stream 3 is delayed by 5 µs. In embodiments where there are four active space-time streams, stream 1 has no delay, stream 2 is delayed by 3 µs, stream 3 is delayed by 5 µs, and stream 4 is delayed by 1 µs.

FIG. 9A shows exemplary cyclic shift delays for an omni portion of a 2 MHz multi-segment implementation, according to an embodiment. In an embodiment, the CSDs shown in FIG. 9A can be applied to multi-segment frames. For each number of transmit antennas shown in the first column, FIG. 9A shows the cyclic shift for one of the antennas (1-4). Cyclic shifts are shown in µs. Although four antennas are shown, any number of antennas can be used. The cyclic shift delays shown in FIG. 9A can be implemented by, for example, any of the devices described herein with respect to FIGS. 1-4 such as, for example, the transmitter 222, the TX special processor 220 and/or the cyclic prefix generator 416. In some embodiments, each antenna can be related to a different space-time stream.

As shown in FIG. 9A, in embodiments where there is one active antenna, the antenna has no delay. In embodiments where there are two active antennas, antenna 1 has no delay and antenna 2 is delayed by 4 µs. In embodiments where there are three active antennas, antenna 1 has no delay, antenna 2 is delayed by 4 µs, and antenna 3 is delayed by 2 µs. In embodiments where there are four active antennas, antenna 1 has no delay, antenna 2 is delayed by 4 µs, antenna 3 is delayed by 2 µs, and antenna 4 is delayed by 6 µs.

FIG. 9B shows exemplary cyclic shift delays for an omni portion of a 2 MHz multi-segment implementation, according to another embodiment. In an embodiment, the CSDs shown in FIG. 9B can be applied to multi-segment frames. For each number of transmit antennas shown in the first column, FIG. 9B shows the cyclic shift for one of the antennas (1-4). Cyclic shifts are shown in µs. Although four antennas are shown, any number of antennas can be used. The cyclic shift delays shown in FIG. 9B can be implemented by, for example, any of the devices described herein with respect to FIGS. 1-4 such as, for example, the transmitter 222, the TX special processor 220 and/or the cyclic prefix generator 416. In some embodiments, each antenna can be related to a different space-time stream.

As shown in FIG. 9B, in embodiments where there is one active antenna, the antenna has no delay. In embodiments where there are two active antennas, antenna 1 has no delay and antenna 2 is delayed by 3 µs. In embodiments where there are three active antennas, antenna 1 has no delay, antenna 2 is delayed by 3 µs, and antenna 3 is delayed by 5 µs. In embodiments where there are four active antennas, antenna 1 has no delay, antenna 2 is delayed by 3 µs, antenna 3 is delayed by 5 µs, and antenna 4 is delayed by 1 µs.

FIG. 10A shows exemplary cyclic shift delays for a precoded portion of a 1 MHz single-segment implementation, according to an embodiment. For each number of space-time streams shown in the first column, FIG. 10A shows the cyclic shift for one of the streams (1-4). Cyclic shifts are shown in µs. Although four streams are shown, any number of streams can be used. The cyclic shift delays shown in FIG. 10A can be implemented by, for example, any of the devices described herein with respect to FIGS. 1-4 such as, for example, the transmitter 222, the TX special processor 220 and/or the cyclic prefix generator 416. Within each row, the values for each active stream can be rearranged without loss of generality. In some embodiments, each space-time stream can be related to a different transmit antenna.

As shown in FIG. 10A, in embodiments where there is one active space-time stream, the stream has no delay. In embodiments where there are two active space-time streams, stream 1 has no delay and stream 2 is delayed by 4 µs. In various embodiments, when there are two streams, the stream delays can be substantially uniformly distributed within the period. The period can be, for example, a symbol period and/or a short training field (STF) period. In the illustrated embodiment, the period is 8 µs.

Referring still to FIG. 10A, in embodiments where there are three active space-time streams, stream 1 has no delay, stream 2 is delayed by 4 µs, and stream 3 is delayed by 2 µs. In various embodiments, when there are three streams, the stream delays can take three out of four substantially uniformly distributed delay values within the period. In embodiments where there are four active space-time streams, stream 1 has no delay, stream 2 is delayed by 4 µs, stream 3 is delayed by 2 µs, and stream 4 is delayed by 6 µs. In various embodiments, when there are four streams, the stream delays can be substantially uniformly distributed within the period. In an embodiment, the delays shown in FIG. 10A can be halved, for example, in implementations using a SGI.

FIG. 10B shows exemplary cyclic shift delays for a precoded portion of a 1 MHz single-segment implementation, according to another embodiment. For each number of space-time streams shown in the first column, FIG. 10B shows the cyclic shift for one of the streams (1-4). Cyclic shifts are shown in µs. Although four streams are shown, any number of streams can be used. The cyclic shift delays shown in FIG. 10B can be implemented by, for example, any of the devices described herein with respect to FIGS. 1-4 such as, for example, the transmitter 222, the TX special processor 220 and/or the cyclic prefix generator 416. In some embodiments, each space-time stream can be related to a different transmit antenna.

As shown in FIG. 10B, in embodiments where there is one active space-time stream, the stream has no delay. In embodiments where there are two active space-time streams, stream 1 has no delay and stream 2 is delayed by 4 µs. In embodiments where there are three active space-time streams, stream 1 has no delay, stream 2 is delayed by 4 µs, and stream 3 is delayed by 6 µs. In embodiments where there are four active space-time streams, stream 1 has no delay, stream 2 is delayed by 4 µs, stream 3 is delayed by 6 µs, and stream 4 is delayed by 2 µs. In an embodiment, the delays shown in FIG. 10B can be halved, for example, in implementations using a SGI.

FIG. 10C shows exemplary cyclic shift delays for a precoded portion of a 1 MHz single-segment implementation, according to another embodiment. For each number of space-time streams shown in the first column, FIG. 10C shows the cyclic shift for one of the streams (1-4). Cyclic shifts are shown in µs. Although four streams are shown, any number of streams can be used. The cyclic shift delays shown in FIG. 10C can be implemented by, for example, any of the devices described herein with respect to FIGS. 1-4 such as, for example, the transmitter 222, the TX special processor 220 and/or the cyclic prefix generator 416. In some embodiments, each space-time stream can be related to a different transmit antenna.

As shown in FIG. 10C, in embodiments where there is one active space-time stream, the stream has no delay. In embodiments where there are two active space-time streams, stream 1 has no delay and stream 2 is delayed by 2 µs. In embodiments where there are three active space-time streams, stream 1 has no delay, stream 2 is delayed by 2 µs, and stream 3 is delayed by 4 µs. In embodiments where there are four active space-time streams, stream 1 has no delay, stream 2 is delayed by 2 µs, stream 3 is delayed by 4 µs, and stream 4 is delayed by 6 µs. In an embodiment, the delays shown in FIG. 10C can be halved, for example, in implementations using a SGI.

FIG. 10D shows exemplary cyclic shift delays for a precoded portion of a 1 MHz single-segment implementation, according to another embodiment. For each number of space-time streams shown in the first column, FIG. 10D shows the cyclic shift for one of the streams (1-4). Cyclic shifts are shown in µs. Although four streams are shown, any number of streams can be used. The cyclic shift delays shown in FIG. 10D can be implemented by, for example, any of the devices described herein with respect to FIGS. 1-4 such as, for example, the transmitter 222, the TX special processor 220 and/or the cyclic prefix generator 416. In some embodiments, each space-time stream can be related to a different transmit antenna.

As shown in FIG. 10D, in embodiments where there is one active space-time stream, the stream has no delay. In embodiments where there are two active space-time streams, stream 1 has no delay and stream 2 is delayed by 2 µs. In embodiments where there are three active space-time streams, stream 1 has no delay, stream 2 is delayed by 2 µs, and stream 3 is delayed by 6 µs. In embodiments where there are four active space-time streams, stream 1 has no delay, stream 2 is delayed by 2 µs, stream 3 is delayed by 6 µs, and stream 4 is delayed by 4 µs. In an embodiment, the delays shown in FIG. 10D can be halved, for example, in implementations using a SGI.

FIG. 10E shows exemplary cyclic shift delays for a precoded portion of a 1 MHz single-segment implementation, according to another embodiment. For each number of space-time streams shown in the first column, FIG. 10E shows the cyclic shift for one of the streams (1-4). Cyclic shifts are shown in μs. Although four streams are shown, any number of streams can be used. The cyclic shift delays shown in FIG. 10E can be implemented by, for example, any of the devices described herein with respect to FIGS. 1-4 such as, for example, the transmitter 222, the TX special processor 220 and/or the cyclic prefix generator 416. In some embodiments, each space-time stream can be related to a different transmit antenna.

As shown in FIG. 10E, in embodiments where there is one active space-time stream, the stream has no delay. In embodiments where there are two active space-time streams, stream 1 has no delay and stream 2 is delayed by 6 μs. In embodiments where there are three active space-time streams, stream 1 has no delay, stream 2 is delayed by 6 μs, and stream 3 is delayed by 2 μs. In embodiments where there are four active space-time streams, stream 1 has no delay, stream 2 is delayed by 6 μs, stream 3 is delayed by 2 μs, and stream 4 is delayed by 4 μs. In an embodiment, the delays shown in FIG. 10E can be halved, for example, in implementations using a SGI.

FIG. 10F shows exemplary cyclic shift delays for a precoded portion of a 1 MHz single-segment implementation, according to another embodiment. For each number of space-time streams shown in the first column, FIG. 10F shows the cyclic shift for one of the streams (1-4). Cyclic shifts are shown in μs. Although four streams are shown, any number of streams can be used. The cyclic shift delays shown in FIG. 10F can be implemented by, for example, any of the devices described herein with respect to FIGS. 1-4 such as, for example, the transmitter 222, the TX special processor 220 and/or the cyclic prefix generator 416. In some embodiments, each space-time stream can be related to a different transmit antenna.

As shown in FIG. 10F, in embodiments where there is one active space-time stream, the stream has no delay. In embodiments where there are two active space-time streams, stream 1 has no delay and stream 2 is delayed by 6 μs. In embodiments where there are three active space-time streams, stream 1 has no delay, stream 2 is delayed by 6 μs, and stream 3 is delayed by 4 μs. In embodiments where there are four active space-time streams, stream 1 has no delay, stream 2 is delayed by 6 μs, stream 3 is delayed by 4 μs, and stream 4 is delayed by 2 μs. In an embodiment, the delays shown in FIG. 10F can be halved, for example, in implementations using a SGI.

The cyclic shift delays shown in FIGS. 10A-10F can be said to be "nested." For example, the cyclic shift delay values for four-stream modes include all of the cyclic shift delays for three-stream modes, the cyclic shift delay values for three-stream modes include all of the cyclic shift delays for two-stream modes, and so on. Nested cyclic shift delays may simplify implementation in hardware and/or reduce memory requirements. In various embodiments, however, cyclic shift delays are not nested. FIGS. 10G-10J show un-nested shift delays, according to various embodiments. The cyclic shift delays shown in FIGS. 10G-10J are the result of simulations on different CSD possibilities, optimized with respect to a metric criteria (discussed below with respect to FIG. 12).

FIG. 10G shows exemplary cyclic shift delays for a precoded portion of a 1 MHz single-segment implementation, according to another embodiment. For each number of space-time streams shown in the first column, FIG. 10G shows the cyclic shift for one of the streams (1-4). Cyclic shifts are shown in μs. Although four streams are shown, any number of streams can be used. The cyclic shift delays shown in FIG. 10G can be implemented by, for example, any of the devices described herein with respect to FIGS. 1-4 such as, for example, the transmitter 222, the TX special processor 220 and/or the cyclic prefix generator 416. In some embodiments, each space-time stream can be related to a different transmit antenna.

As shown in FIG. 10G, in embodiments where there is one active space-time stream, the stream has no delay. In embodiments where there are two active space-time streams, stream 1 has no delay and stream 2 is delayed by 3 μs. In embodiments where there are three active space-time streams, stream 1 has no delay, stream 2 is delayed by 2 μs, and stream 3 is delayed by 6 μs. In embodiments where there are four active space-time streams, stream 1 has no delay, stream 2 is delayed by 2 μs, stream 3 is delayed by 3 μs, and stream 4 is delayed by 7 μs.

FIG. 10H shows exemplary cyclic shift delays for a precoded portion of a 1 MHz single-segment implementation, according to another embodiment. For each number of space-time streams shown in the first column, FIG. 10H shows the cyclic shift for one of the streams (1-4). Cyclic shifts are shown in μs. Although four streams are shown, any number of streams can be used. The cyclic shift delays shown in FIG. 10H can be implemented by, for example, any of the devices described herein with respect to FIGS. 1-4 such as, for example, the transmitter 222, the TX special processor 220 and/or the cyclic prefix generator 416. In some embodiments, each space-time stream can be related to a different transmit antenna.

As shown in FIG. 10H, in embodiments where there is one active space-time stream, the stream has no delay. In embodiments where there are two active space-time streams, stream 1 has no delay and stream 2 is delayed by 3 μs. In embodiments where there are three active space-time streams, stream 1 has no delay, stream 2 is delayed by 2 μs, and stream 3 is delayed by 6 μs. In embodiments where there are four active space-time streams, stream 1 has no delay, stream 2 is delayed by 4 μs, stream 3 is delayed by 5 μs, and stream 4 is delayed by 7 μs.

FIG. 10I shows exemplary cyclic shift delays for a precoded portion of a 1 MHz single-segment implementation, according to another embodiment. For each number of space-time streams shown in the first column, FIG. 10I shows the cyclic shift for one of the streams (1-4). Cyclic shifts are shown in μs. Although four streams are shown, any number of streams can be used. The cyclic shift delays shown in FIG. 10I can be implemented by, for example, any of the devices described herein with respect to FIGS. 1-4 such as, for example, the transmitter 222, the TX special processor 220 and/or the cyclic prefix generator 416. In some embodiments, each space-time stream can be related to a different transmit antenna.

As shown in FIG. 10I, in embodiments where there is one active space-time stream, the stream has no delay. In embodiments where there are two active space-time streams, stream 1 has no delay and stream 2 is delayed by 3 μs. In embodiments where there are three active space-time streams, stream 1 has no delay, stream 2 is delayed by 2 μs, and stream 3 is delayed by 5 μs. In embodiments where there are four active space-time streams, stream 1 has no delay, stream 2 is delayed by 2 μs, stream 3 is delayed by 3 μs, and stream 4 is delayed by 7 μs.

FIG. 10J shows exemplary cyclic shift delays for a precoded portion of a 1 MHz single-segment implementation, according to another embodiment. For each number of space-time streams shown in the first column, FIG. 10J shows the cyclic shift for one of the streams (1-4). Cyclic shifts are shown in µs. Although four streams are shown, any number of streams can be used. The cyclic shift delays shown in FIG. 10J can be implemented by, for example, any of the devices described herein with respect to FIGS. 1-4 such as, for example, the transmitter 222, the TX special processor 220 and/or the cyclic prefix generator 416. In some embodiments, each space-time stream can be related to a different transmit antenna.

As shown in FIG. 10J, in embodiments where there is one active space-time stream, the stream has no delay. In embodiments where there are two active space-time streams, stream 1 has no delay and stream 2 is delayed by 3 µs. In embodiments where there are three active space-time streams, stream 1 has no delay, stream 2 is delayed by 2 µs, and stream 3 is delayed by 5 µs. In embodiments where there are four active space-time streams, stream 1 has no delay, stream 2 is delayed by 4 µs, stream 3 is delayed by 5 µs, and stream 4 is delayed by 7 µs.

According to the metric criteria discussed above, certain nested cyclic shift delays can approach the performance of the un-nested cyclic shift delays shown in FIGS. 10A-10F above. One such high-performance set of nested cyclic shift delays is shown in FIG. 10K, discussed below.

FIG. 10K shows exemplary cyclic shift delays for a pre-coded portion of a 1 MHz single-segment implementation, according to another embodiment. For each number of space-time streams shown in the first column, FIG. 10K shows the cyclic shift for one of the streams (1-4). Cyclic shifts are shown in µs. Although four streams are shown, any number of streams can be used. The cyclic shift delays shown in FIG. 10K can be implemented by, for example, any of the devices described herein with respect to FIGS. 1-4 such as, for example, the transmitter 222, the TX special processor 220 and/or the cyclic prefix generator 416. In some embodiments, each space-time stream can be related to a different transmit antenna.

As shown in FIG. 10K, in embodiments where there is one active space-time stream, the stream has no delay. In embodiments where there are two active space-time streams, stream 1 has no delay and stream 2 is delayed by 3 µs. In embodiments where there are three active space-time streams, stream 1 has no delay, stream 2 is delayed by 2 µs, and stream 3 is delayed by 7 µs. In embodiments where there are four active space-time streams, stream 1 has no delay, stream 2 is delayed by 3 µs, stream 3 is delayed by 7 µs, and stream 4 is delayed by 2 µs.

FIG. 10L shows exemplary cyclic shift delays for a pre-coded portion of a 1 MHz single-segment implementation, according to another embodiment. For each number of space-time streams shown in the first column, FIG. 10L shows the cyclic shift for one of the streams (1-4). Cyclic shifts are shown in µs. Although four streams are shown, any number of streams can be used. The cyclic shift delays shown in FIG. 10L can be implemented by, for example, any of the devices described herein with respect to FIGS. 1-4 such as, for example, the transmitter 222, the TX special processor 220 and/or the cyclic prefix generator 416. In some embodiments, each space-time stream can be related to a different transmit antenna.

As shown in FIG. 10L, in embodiments where there is one active space-time stream, the stream has no delay. In embodiments where there are two active space-time streams, stream 1 has no delay and stream 2 is delayed by 5 µs. In embodiments where there are three active space-time streams, stream 1 has no delay, stream 2 is delayed by 5 µs, and stream 3 is delayed by 1 µs. In embodiments where there are four active space-time streams, stream 1 has no delay, stream 2 is delayed by 5 µs, stream 3 is delayed by 1 µs, and stream 4 is delayed by 4 µs.

FIG. 10M shows exemplary cyclic shift delays for a pre-coded portion of a 1 MHz single-segment implementation, according to another embodiment. For each number of space-time streams shown in the first column, FIG. 10M shows the cyclic shift for one of the streams (1-4). Cyclic shifts are shown in µs. Although four streams are shown, any number of streams can be used. The cyclic shift delays shown in FIG. 10M can be implemented by, for example, any of the devices described herein with respect to FIGS. 1-4 such as, for example, the transmitter 222, the TX special processor 220 and/or the cyclic prefix generator 416. In some embodiments, each space-time stream can be related to a different transmit antenna.

As shown in FIG. 10M, in embodiments where there is one active space-time stream, the stream has no delay. In embodiments where there are two active space-time streams, stream 1 has no delay and stream 2 is delayed by 7 µs. In embodiments where there are three active space-time streams, stream 1 has no delay, stream 2 is delayed by 7 µs, and stream 3 is delayed by 3 µs. In embodiments where there are four active space-time streams, stream 1 has no delay, stream 2 is delayed by 7 µs, stream 3 is delayed by 3 µs, and stream 4 is delayed by 4 µs.

FIG. 10N shows exemplary cyclic shift delays for a pre-coded portion of a 1 MHz single-segment implementation, according to another embodiment. For each number of space-time streams shown in the first column, FIG. 10N shows the cyclic shift for one of the streams (1-4). Cyclic shifts are shown in µs. Although four streams are shown, any number of streams can be used. The cyclic shift delays shown in FIG. 10N can be implemented by, for example, any of the devices described herein with respect to FIGS. 1-4 such as, for example, the transmitter 222, the TX special processor 220 and/or the cyclic prefix generator 416. In some embodiments, each space-time stream can be related to a different transmit antenna.

As shown in FIG. 10N, in embodiments where there is one active space-time stream, the stream has no delay. In embodiments where there are two active space-time streams, stream 1 has no delay and stream 2 is delayed by 5 µs. In embodiments where there are three active space-time streams, stream 1 has no delay, stream 2 is delayed by 5 µs, and stream 3 is delayed by 1 µs. In embodiments where there are four active space-time streams, stream 1 has no delay, stream 2 is delayed by 4 µs, stream 3 is delayed by 6 µs, and stream 4 is delayed by 7 µs.

In an embodiment, the cyclic shift delays shown in FIGS. 10A-10O can be implemented in a 32-point FFT mode, and the cyclic shift delays shown in FIGS. 6A-d can be implemented in a 64-point FFT mode. In various embodiments, the devices of FIGS. 1-4 (for example, the AP 110), can be configured to operate in one or more of the 32-point FFT mode, the 64-point FFT mode, a 1 MHz mode, and a 2 MHz mode.

FIG. 10O shows exemplary cyclic shift delays for a pre-coded portion of a 1 single-segment implementation, according to another embodiment. In an embodiment, the CSDs shown in FIG. 10O can be applied to single-segment frames. For each number of space-time streams shown in the first column, FIG. 10O shows the cyclic shift for one of the streams (1-4). Cyclic shifts are shown in µs. Although four streams are shown, any number of streams can be used. The cyclic shift delays shown in FIG. 10O can be implemented by, for example, any of the devices described herein with respect to FIGS. 1-4 such as, for example, the transmitter 222, the TX special processor 220 and/or the cyclic prefix generator 416. In some embodiments, each space-time stream can be related to a different transmit antenna.

As shown in FIG. 10O, in embodiments where there is one active space-time stream, the stream has no delay. In embodiments where there are two active space-time streams, stream 1 has no delay and stream 2 is delayed by 4 μs. In embodiments where there are three active space-time streams, stream 1 has no delay, stream 2 is delayed by 4 μs, and stream 3 is delayed by 1 μs. In embodiments where there are four active space-time streams, stream 1 has no delay, stream 2 is delayed by 4 μs, stream 3 is delayed by 1 μs, and stream 4 is delayed by 5 μs.

Figure 11:
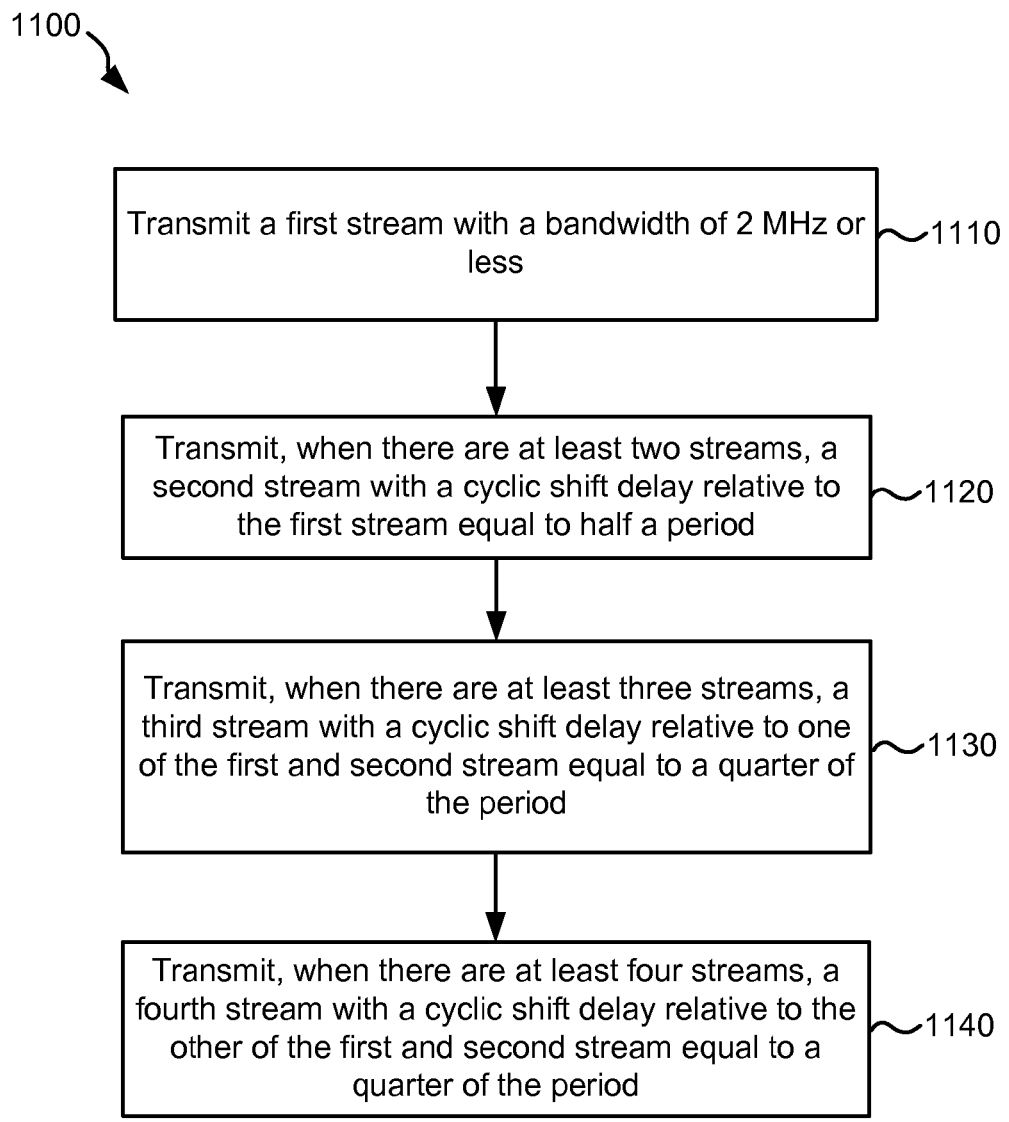
FIG. 11 shows a flowchart of an exemplary method for communicating over one or more space-time streams.

FIG. 11 shows a flowchart 1100 of an exemplary method for communicating over one or more space-time streams. The method can implement one or more of the cyclic shift delays described above with respect to FIGS. 8A-8E, 9A-9B, and 10A-10O. Although the method is described below with respect to elements of the AP 110 (FIG. 1), those having ordinary skill in the art will appreciate that other components may be used to implement one or more of the steps described herein. Although blocks may be described as occurring in a certain order, the blocks can be reordered, blocks can be omitted, and/or additional blocks can be added.

First, at block 1110, the AP 110 transmits a first stream. The AP 110 can transmit the first stream to, for example, one of the UTs 120. In an embodiment, the AP 110 can transmit the first stream with no cyclic shift delay. The AP 110 can transmit the first stream with a bandwidth of 2 MHz or less. In an embodiment, the bandwidth is 2 MHz. In another embodiment, the bandwidth is 1 MHz.

Next, at block 1120, the AP 110 transmits a second stream if there is more than one stream. The AP 110 can transmit the second stream with a cyclic shift delay relative to the first stream equal to half a period. As discussed above, the period can be a STF period, a SGI duration, a symbol period, etc. In various embodiments, the AP 110 can transmit the second stream with a cyclic shift delay according to the table shown in one or more of FIGS. 8A-8E, 9A-9B, and 10A-10O.

Next, at block 1130, the AP 110 transmits a third stream if there are more than two streams. The AP 110 can transmit the third stream with a cyclic shift delay equal to a quarter of the period, and the delay can be relative to either the first or the second stream. In various embodiments, the AP 110 can transmit the third stream with a cyclic shift delay according to the table shown in one or more of FIGS. 8A-8E, 9A-9B, and 10A-10O.

Next, at block 1140, the AP 110 transmits a fourth stream if there are more than three streams. The AP 110 can transmit the fourth stream with a cyclic shift delay equal to a quarter of the period, and the delay can be relative to either the first or the second stream, whichever the delay of the third stream is not relative to. In other words, if the cyclic shift delay of the third stream is relative to the first stream, then the cyclic shift delay of the fourth stream is relative to the second stream, and vice versa. In various embodiments, the AP 110 can transmit the fourth stream with a cyclic shift delay according to the table shown in one or more of FIGS. 8A-8E, 9A-9B, and 10A-10O.

Figure 12:
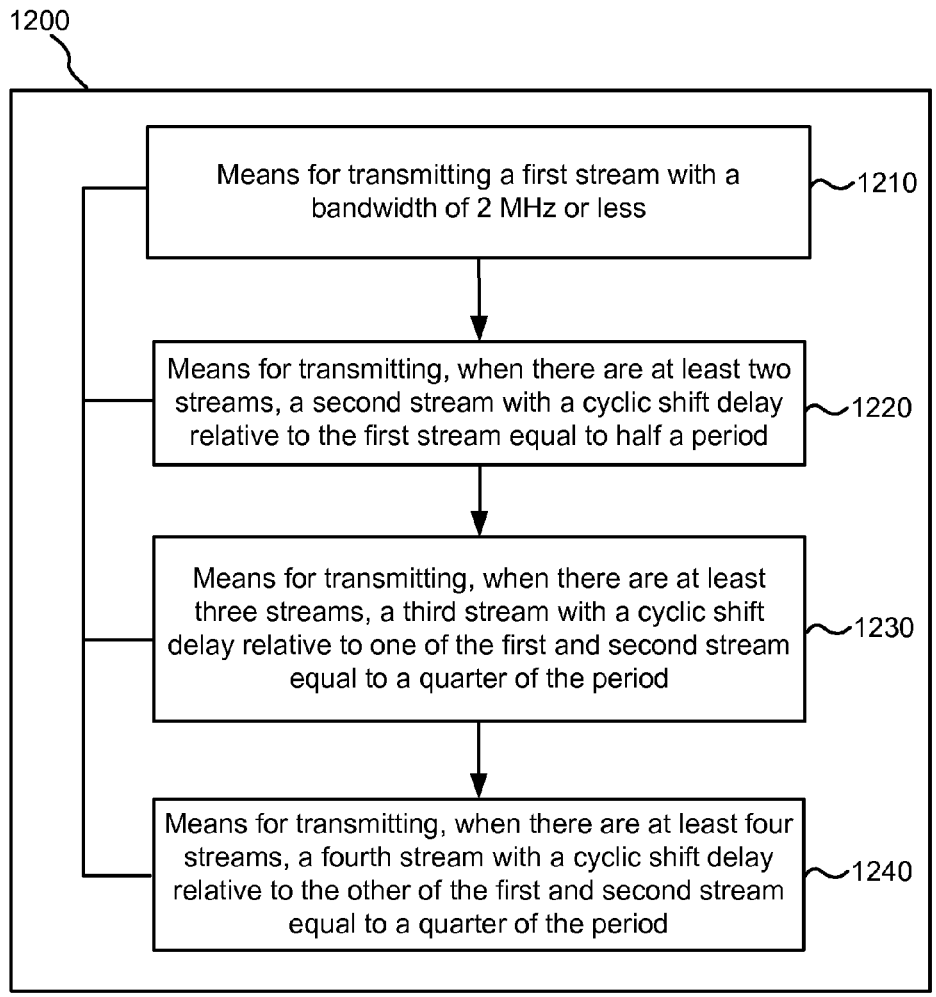
FIG. 12 is a functional block diagram of an exemplary wireless device that may be employed within the communications network of FIG. 1.

FIG. 12 is a functional block diagram of an exemplary wireless device 1200 that may be employed within the communications network 100 of FIG. 1. The device 1200 comprises means 1210, 1220, 1230, and 1240 for transmitting first, second, third, and fourth space-time streams, respectively. In an embodiment, the means 1210 for transmitting a first stream can be configured to perform one or more of the functions discussed above with respect to the block 1110 illustrated in FIG. 11. The means 1210 for transmitting a first stream may correspond to one or more of the OFDM modulator 400 (FIG. 4), the transmitters 222a through 222m (FIG. 2), the TX special processors 220 and 290, the transmitter 310 (FIG. 3), the DSP 320, the transceiver 314, and the processor 304.

In an embodiment, the means 1220 for transmitting a second stream can be configured to perform one or more of the functions discussed above with respect to the block 1120 illustrated in FIG. 11. The means 1220 for transmitting a second stream may correspond to one or more of the OFDM modulator 400 (FIG. 4), the transmitters 222a through 222m (FIG. 2), the TX special processors 220 and 290, the transmitter 310 (FIG. 3), the DSP 320, the transceiver 314, and the processor 304.

In an embodiment, the means 1230 for transmitting a second stream can be configured to perform one or more of the functions discussed above with respect to the block 1130 illustrated in FIG. 11. The means 1230 for transmitting a second stream may correspond to one or more of the OFDM modulator 400 (FIG. 4), the transmitters 222a through 222m (FIG. 2), the TX special processors 220 and 290, the transmitter 310 (FIG. 3), the DSP 320, the transceiver 314, and the processor 304.

In an embodiment, the means 1240 for transmitting a second stream can be configured to perform one or more of the functions discussed above with respect to the block 1140 illustrated in FIG. 11. The means 1240 for transmitting a second stream may correspond to one or more of the OFDM modulator 400 (FIG. 4), the transmitters 222a through 222m (FIG. 2), the TX special processors 220 and 290, the transmitter 310 (FIG. 3), the DSP 320, the transceiver 314, and the processor 304.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Figure 13:
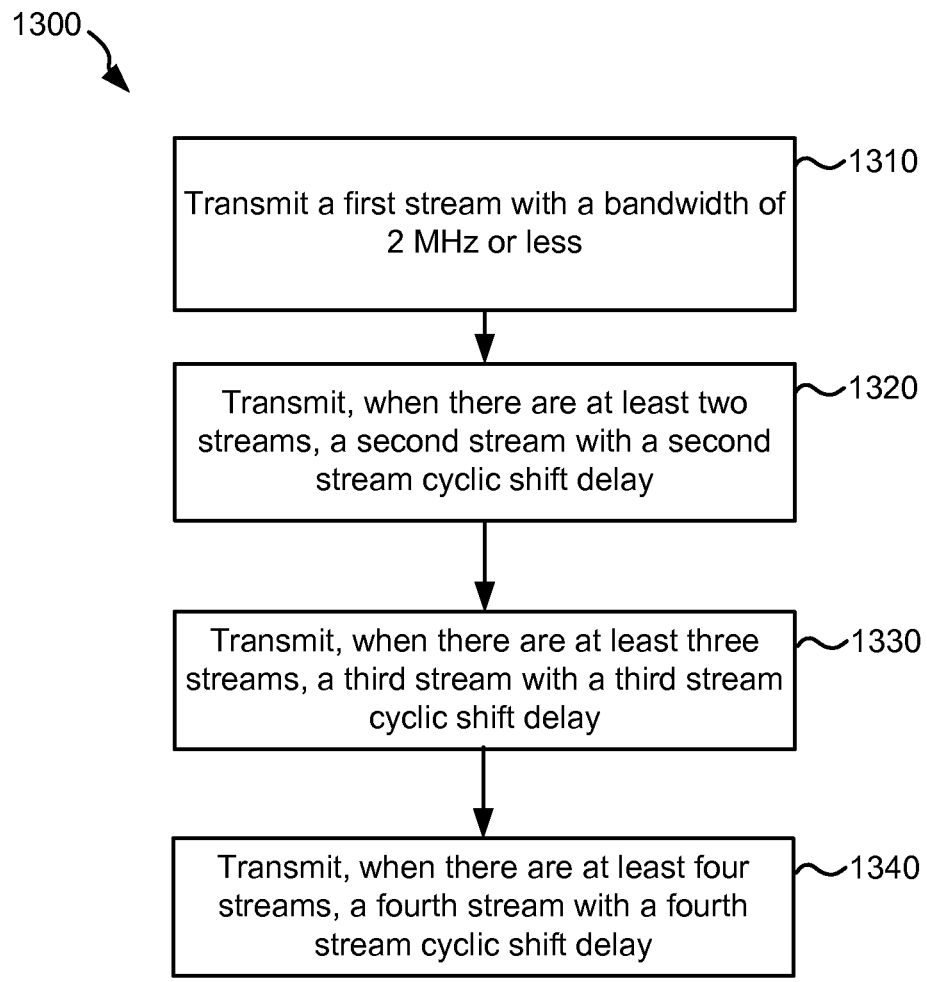
FIG. 13 shows a flowchart of another exemplary method for communicating over one or more space-time streams.

FIG. 13 shows a flowchart 1300 of another exemplary method for communicating over one or more space-time streams. The method can implement one or more of the cyclic shift delays described above with respect to FIGS. 8A-8E, 9A-9B, and 10A-10O. Although the method is described below with respect to elements of the AP 110 (FIG. 1), those having ordinary skill in the art will appreciate that other components may be used to implement one or more of the steps described herein. Although blocks may be described as occurring in a certain order, the blocks can be reordered, blocks can be omitted, and/or additional blocks can be added.

First, at block 1310, the AP 110 transmits a first stream. The AP 110 can transmit the first stream to, for example, one of the UTs 120. In an embodiment, the AP 110 can transmit the first stream with no cyclic shift delay. In another embodiment, the AP 110 can transmit the first stream with a reference cyclic shift delay, and one or more additional streams can be transmitted with cyclic shift delays relative to the first stream. The AP 110 can transmit the first stream with a bandwidth of 2 MHz or less. In an embodiment, the bandwidth is 2 MHz. In another embodiment, the bandwidth is 1 MHz.

Next, at block 1320, the AP 110 transmits a second stream if there is more than one stream. The AP 110 can transmit the second stream with a second stream cyclic shift delay. In an embodiment, the second stream cyclic shift delay can be defined relative to the first stream. In an embodiment, the second stream cyclic shift delay can be a value selected from the set of 1-7 units. In various embodiments, the units can be microseconds, samples, or divisions of the period. For example, in an embodiment, the units can be ⅛ of the period. As discussed above, the period can be a STF period, a SGI duration, a symbol period, etc. In various embodiments, the AP 110 can transmit the second stream with a cyclic shift delay according to the table shown in one or more of FIGS. 8A-8E, 9A-9B, and 10A-10O. In an embodiment, the second stream cyclic shift delay can be unique among one or more additional stream delays.

Next, at block 1330, the AP 110 transmits a third stream if there are more than two streams. The AP 110 can transmit the third stream with a third stream cyclic shift delay. In an embodiment, the third stream cyclic shift delay can be defined relative to the first stream. In an embodiment, the third stream cyclic shift delay can be a value selected from the set of 1-7 units. In various embodiments, the units can be microseconds, samples, or divisions of the period. For example, in an embodiment, the units can be ⅛ of the period. As discussed above, the period can be a STF period, a SGI duration, a symbol period, etc. In various embodiments, the AP 110 can transmit the third stream with a cyclic shift delay according to the table shown in one or more of FIGS. 8A-8E, 9A-9B, and 10A-10O. In an embodiment, the third stream cyclic shift delay can be unique among one or more additional stream delays.

Next, at block 1340, the AP 110 transmits a fourth stream if there are more than three streams. The AP 110 can transmit the fourth stream with a fourth stream cyclic shift delay. In an embodiment, the fourth stream cyclic shift delay can be defined relative to the first stream. In an embodiment, the fourth stream cyclic shift delay can be a value selected from the set of 1-7 units. In various embodiments, the units can be microseconds, samples, or divisions of the period. For example, in an embodiment, the units can be ⅛ of the period. As discussed above, the period can be a STF period, a SGI duration, a symbol period, etc. In various embodiments, the AP 110 can transmit the fourth stream with a cyclic shift delay according to the table shown in one or more of FIGS. 8A-8E, 9A-9B, and 10A-10O. In an embodiment, the fourth stream cyclic shift delay can be unique among one or more additional stream delays.

As discussed above with respect to FIG. 11, the various cyclic shift delays can be selected from the set of 1-7 units, and each cyclic shift delay can be unique among the one or more stream delays. For example, the second, third, and fourth steam delays can be selected from the set of 1-7 units, but no two stream delays may use the same value.

Figure 14:
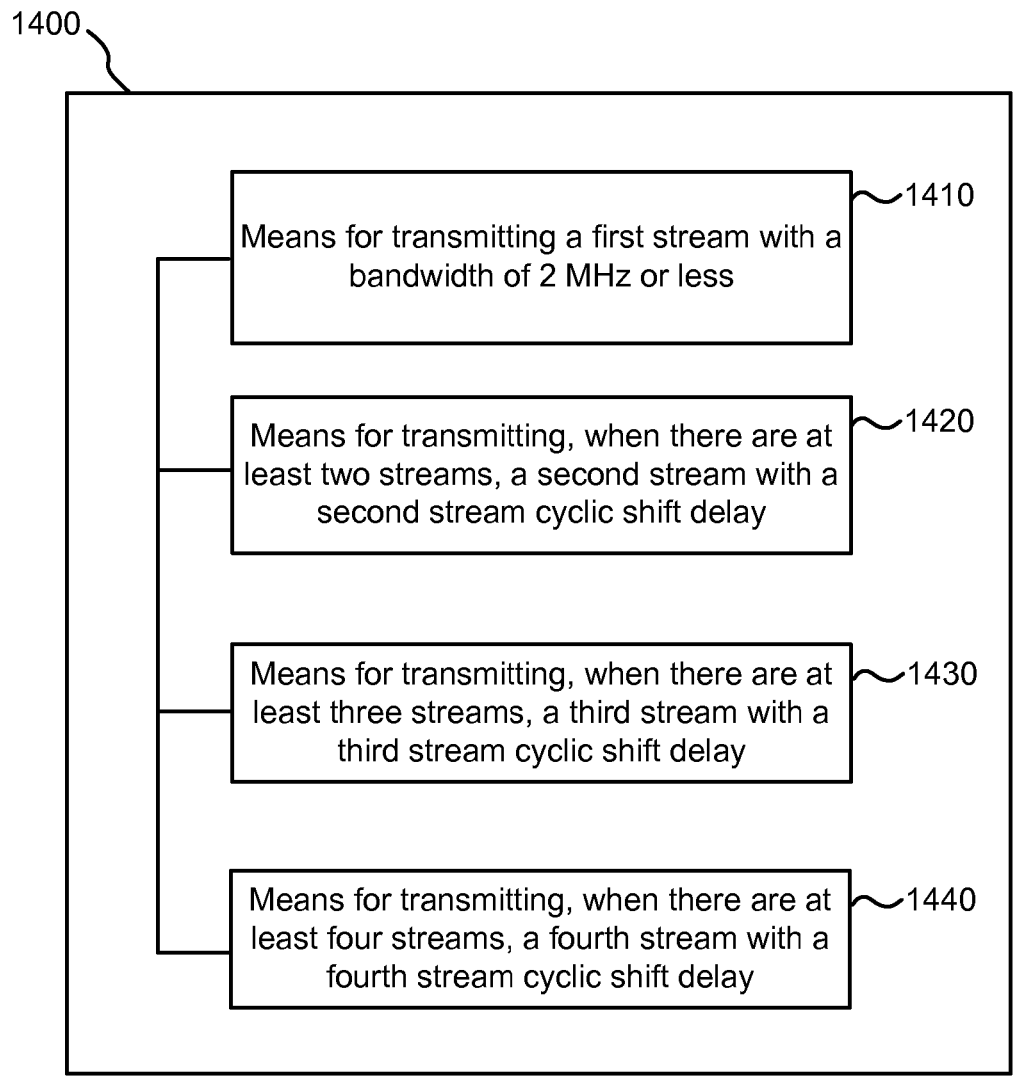
FIG. 14 is a functional block diagram of another exemplary wireless device that may be employed within the communications network of FIG. 1.

FIG. 14 is a functional block diagram of another exemplary wireless device 1400 that may be employed within the communications network 100 of FIG. 1. The device 1400 comprises means 1410, 1420, 1430, and 1440 for transmitting first, second, third, and fourth space-time streams, respectively. In an embodiment, the means 1410 for transmitting a first stream can be configured to perform one or more of the functions discussed above with respect to the block 1310 illustrated in FIG. 13. The means 1410 for transmitting a first stream may correspond to one or more of the OFDM modulator 400 (FIG. 4), the transmitters 222a through 222m (FIG. 2), the TX special processors 220 and 290, the transmitter 310 (FIG. 3), the DSP 320, the transceiver 314, and the processor 304.

In an embodiment, the means 1420 for transmitting a second stream can be configured to perform one or more of the functions discussed above with respect to the block 1320 illustrated in FIG. 13. The means 1420 for transmitting a second stream may correspond to one or more of the OFDM modulator 400 (FIG. 4), the transmitters 222a through 222m (FIG. 2), the TX special processors 220 and 290, the transmitter 310 (FIG. 3), the DSP 320, the transceiver 314, and the processor 304.

In an embodiment, the means 1430 for transmitting a third stream can be configured to perform one or more of the functions discussed above with respect to the block 1330 illustrated in FIG. 13. The means 1430 for transmitting a third stream may correspond to one or more of the OFDM modulator 400 (FIG. 4), the transmitters 222a through 222m (FIG. 2), the TX special processors 220 and 290, the transmitter 310 (FIG. 3), the DSP 320, the transceiver 314, and the processor 304.

In an embodiment, the means 1440 for transmitting a fourth stream can be configured to perform one or more of the functions discussed above with respect to the block 1340 illustrated in FIG. 13. The means 1440 for transmitting a fourth stream may correspond to one or more of the OFDM modulator 400 (FIG. 4), the transmitters 222a through 222m (FIG. 2), the TX special processors 220 and 290, the transmitter 310 (FIG. 3), the DSP 320, the transceiver 314, and the processor 304.

Figure 15:
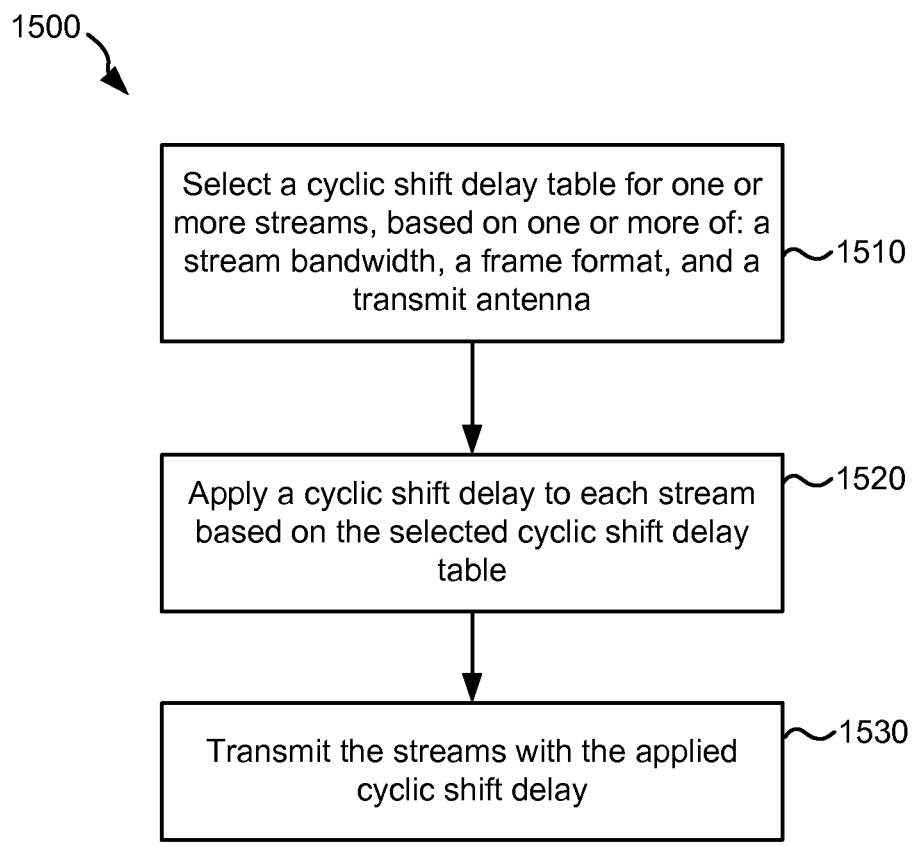
FIG. 15 shows a flowchart of another exemplary method for communicating over one or more space-time streams.

FIG. 15 shows a flowchart 1500 of another exemplary method for communicating over one or more space-time streams. The method can implement one or more of the cyclic shift delays described above with respect to FIGS. 8A-8E, 9A-9B, and 10A-10O. Although the method is described below with respect to elements of the AP 160 (FIG. 1), those having ordinary skill in the art will appreciate that other components may be used to implement one or more of the steps described herein. For example, the UTs 120 can implement the method described herein. Although blocks may be described as occurring in a certain order, the blocks can be reordered, blocks can be omitted, and/or additional blocks can be added.

First, at block 1510, the AP 160 selects a CSD table for one or more streams. The CSD table can be selected based on one or more of: a stream bandwidth, a frame format, and a transmit antenna. In an embodiment, the CSD table can also be selected based on a portion of a data unit being transmitted such as, for example, the omni portion and the precoded portion. For example, the AP 160 may select different CSD tables for 1 MHz and 2 MHz streams, for single-segment and multi-segment modes, for each antenna, etc. Moreover, each and any combination of the above criteria can have a separate corresponding CSD table. For example, the AP 160 may select one CSD table for a 2 MHz single-user mode and another for 1 MHz single-segment mode. The AP 160 can store a plurality of CSD tables for each configuration.

Next, at block 1520, the AP 160 applies a CSD to each of the UT's 120 streams based on the selected CSD table. The CSD can be applied, for example, as discussed above with respect to FIGS. 4 and 5. Moreover, the CSDs can be applied to each of the UT's 120 streams separately. For example, in a multi-user transmission from the AP 160, 2 streams may be assigned to two different UTs 120. In an embodiment, the CSD can be applied to each UT 120 separately, and the CSD values used can correspond to the 2 space-time-stream case for each UT 120. Then, at block 1530, the AP 160 transmits the streams with the applied CSDs. The AP 160 can transmit the streams to, for example, one or more of the UTs 120.

Figure 16:
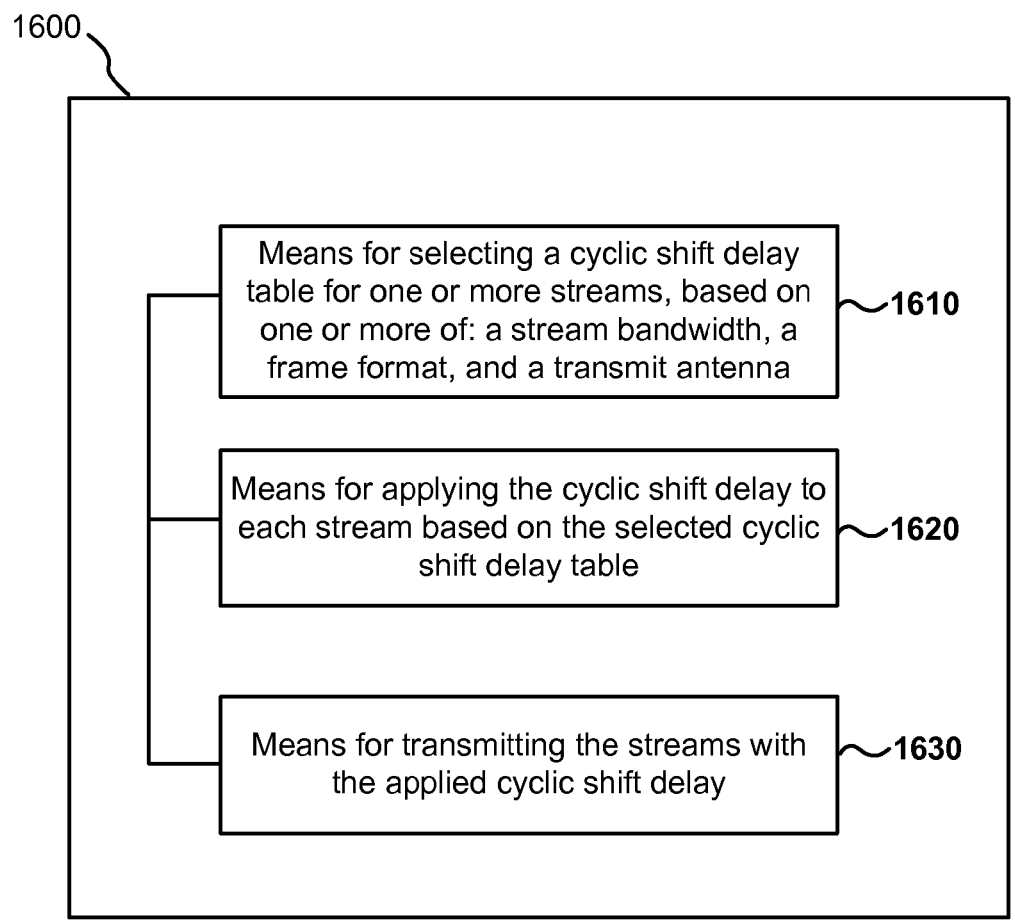
FIG. 16 is a functional block diagram of another exemplary wireless device that may be employed within the communications network of FIG. 1.

FIG. 16 is a functional block diagram of another exemplary wireless device 1600 that may be employed within the communications network 150 of FIG. 1. The device 1600 comprises means 1610 for selecting a cyclic shift delay table for one or more streams, based on one or more of: a stream bandwidth, a frame format, and a transmit antenna. The device 1600 further comprises means 1620 for applying the cyclic shift delay to each stream based on the selected cyclic shift delay table, and means 1630 for transmitting the streams with the applied cyclic shift delay.

In an embodiment, the means 1610 for selecting a cyclic shift delay table can be configured to perform one or more of the functions discussed above with respect to the block 1510 illustrated in FIG. 15. The means 1610 for selecting a cyclic shift delay table may correspond to one or more of the TX special processors 220 and 290, the DSP 320, the transceiver 314, and the processor 304.

In an embodiment, the means 1620 for applying the cyclic shift delay can be configured to perform one or more of the functions discussed above with respect to the block 1520 illustrated in FIG. 15. The means 1620 for applying the cyclic shift delay may correspond to one or more of the OFDM modulator 400 (FIG. 4), the transmitters 222a through 222m (FIG. 2), the TX special processors 220 and 290, the transmitter 310 (FIG. 3), the DSP 320, the transceiver 314, and the processor 304.

In an embodiment, the means 1630 for transmitting the streams with the applied cyclic shift delay can be configured to perform one or more of the functions discussed above with respect to the block 1530 illustrated in FIG. 15. The means 1630 for transmitting the streams with the applied cyclic shift delay may correspond to one or more of the OFDM modulator 400 (FIG. 4), the transmitters 222a through 222m (FIG. 2), the TX special processors 220 and 290, the transmitter 310 (FIG. 3), the DSP 320, the transceiver 314, and the processor 304.

Figure 17:
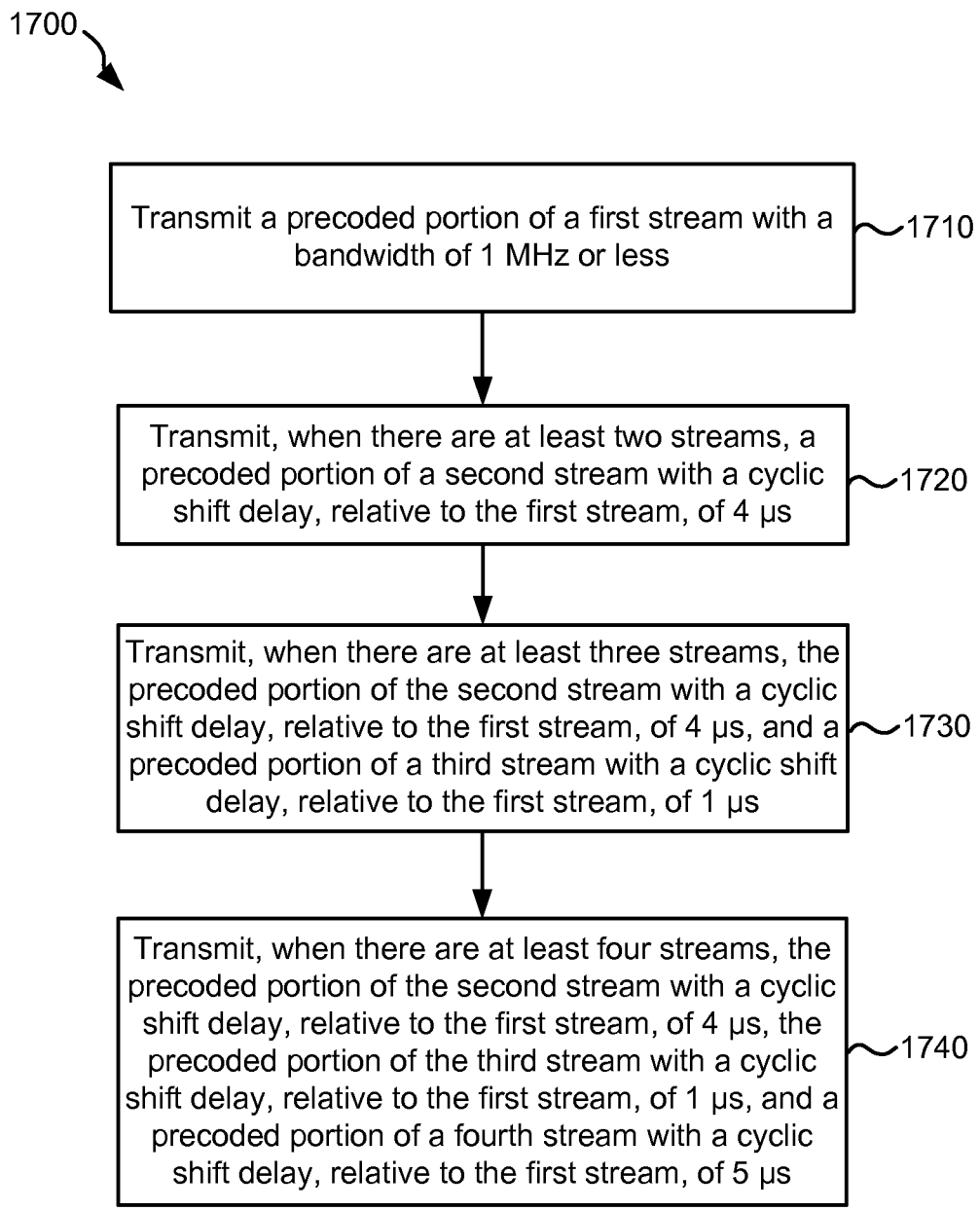
FIG. 17 shows a flowchart of another exemplary method for communicating over one or more space-time streams.

FIG. 17 shows a flowchart 1700 of another exemplary method for communicating over one or more space-time streams. The method can implement one or more of the cyclic shift delays described above, and particularly with respect to FIG. 10O. Although the method is described below with respect to elements of the AP 110 (FIG. 1), those having ordinary skill in the art will appreciate that other components may be used to implement one or more of the steps described herein. Although blocks may be described as occurring in a certain order, the blocks can be reordered, blocks can be omitted, and/or additional blocks can be added.

First, at block 1710, the AP 110 transmits a precoded portion of a first stream. The AP 110 can transmit the first stream to, for example, one of the UTs 120. In an embodiment, the AP 110 can transmit the first stream with no cyclic shift delay. In another embodiment, the AP 110 can transmit the first stream with a reference cyclic shift delay, and one or more additional streams can be transmitted with cyclic shift delays relative to the first stream. The AP 110 can transmit the first stream with a bandwidth of 1 MHz or less. In an embodiment, the bandwidth is 1 MHz.

Next, at block 1720, the AP 110 transmits a precoded portion of a second stream if there is more than one stream. The AP 110 can transmit the second stream with a second stream cyclic shift delay. In an embodiment, the second stream cyclic shift delay can be defined relative to the first stream. In an embodiment, the second stream cyclic shift delay can be 4 μs.

Next, at block 1730, the AP 110 transmits a precoded portion of a third stream if there are more than two streams. The AP 110 can transmit the third stream with a third stream cyclic shift delay. In an embodiment, the third stream cyclic shift delay can be defined relative to the first stream. In an embodiment, the third stream cyclic shift delay can be 1 μs.

Next, at block 1740, the AP 110 transmits a precoded portion of a fourth stream if there are more than three streams. The AP 110 can transmit the fourth stream with a fourth stream cyclic shift delay. In an embodiment, the fourth stream cyclic shift delay can be defined relative to the first stream. In an embodiment, the fourth stream cyclic shift delay can be 5 μs.

Figure 18:
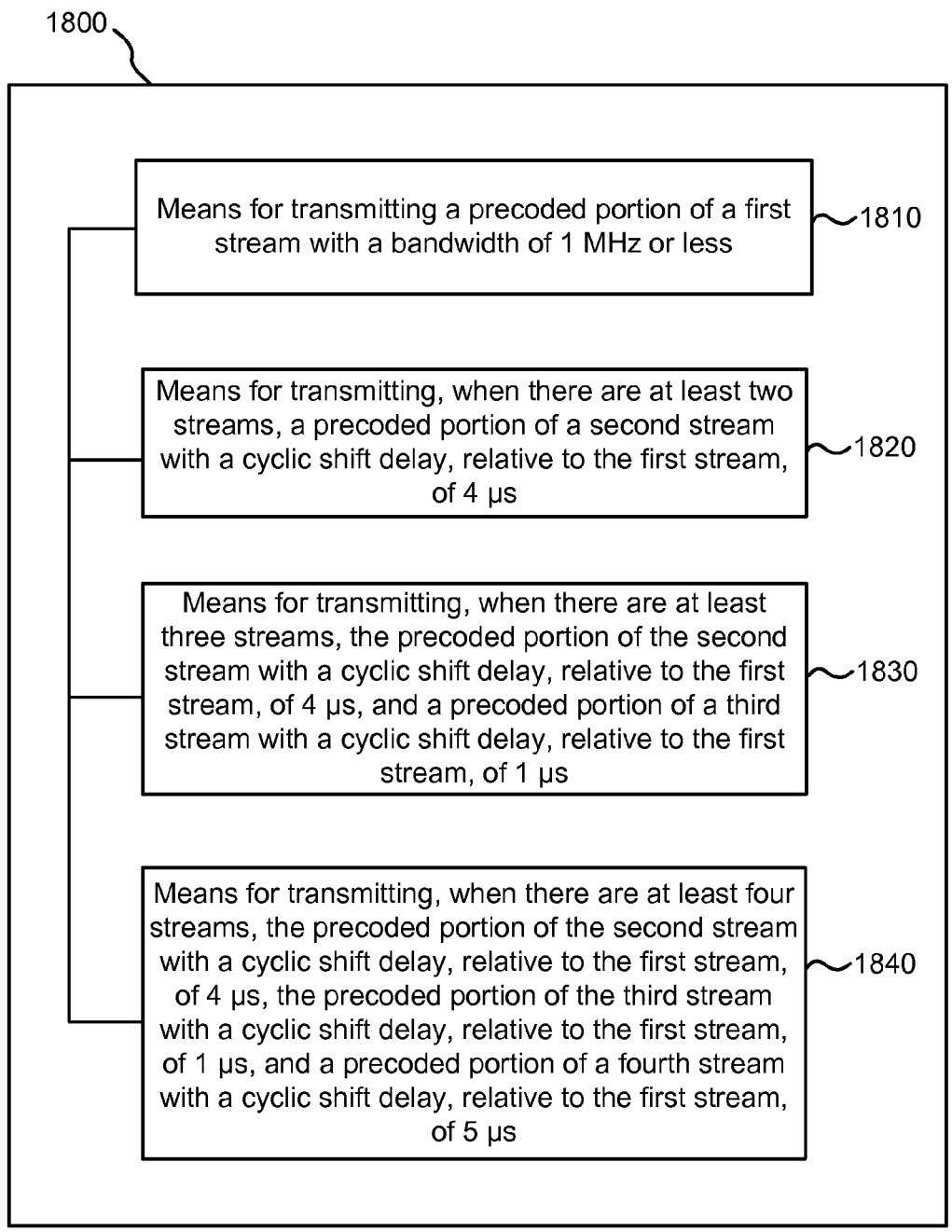
FIG. 18 is a functional block diagram of another exemplary wireless device that may be employed within the communications network of FIG. 1

FIG. 18 is a functional block diagram of another exemplary wireless device 1800 that may be employed within the communications network 100 of FIG. 1. The device 1800 comprises means 1810, 1820, 1830, and 1840 for transmitting first, second, third, and fourth space-time streams, respectively. In an embodiment, the means 1810 for transmitting a first stream can be configured to perform one or more of the functions discussed above with respect to the block 1710 illustrated in FIG. 17. The means 1810 for transmitting a first stream may correspond to one or more of the OFDM modulator 400 (FIG. 4), the transmitters 222a through 222m (FIG. 2), the TX special processors 220 and 290, the transmitter 310 (FIG. 3), the DSP 320, the transceiver 314, and the processor 304.

In an embodiment, the means 1820 for transmitting a second stream can be configured to perform one or more of the functions discussed above with respect to the block 1720 illustrated in FIG. 17. The means 1820 for transmitting a second stream may correspond to one or more of the OFDM modulator 400 (FIG. 4), the transmitters 222a through 222m (FIG. 2), the TX special processors 220 and 290, the transmitter 310 (FIG. 3), the DSP 320, the transceiver 314, and the processor 304.

In an embodiment, the means 1830 for transmitting a third stream can be configured to perform one or more of the functions discussed above with respect to the block 1730 illustrated in FIG. 17. The means 1830 for transmitting a third stream may correspond to one or more of the OFDM modulator 400 (FIG. 4), the transmitters 222a through 222m (FIG. 2), the TX special processors 220 and 290, the transmitter 310 (FIG. 3), the DSP 320, the transceiver 314, and the processor 304.

In an embodiment, the means 1840 for transmitting a fourth stream can be configured to perform one or more of the functions discussed above with respect to the block 1740 illustrated in FIG. 17. The means 1840 for transmitting a fourth stream may correspond to one or more of the OFDM modulator 400 (FIG. 4), the transmitters 222a through 222m (FIG. 2), the TX special processors 220 and 290, the transmitter 310 (FIG. 3), the DSP 320, the transceiver 314, and the processor 304.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base user terminal as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base user terminal can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof. Aspects described herein, or additional aspects, may be further described in the attached Appendix. The materials included in the Appendix are illustrative only, and are not limiting in any way. Those of skill in the art will appreciate various aspects based on the description included herein, and will further appreciate benefits and advantages of such aspects.

The invention claimed is:

1. A method of communicating over one or more space-time streams, the method comprising:
   transmitting a precoded portion of a first stream with a bandwidth of 1 MHz or less;
   transmitting, when there are at least two streams, a precoded portion of a second stream with a cyclic shift delay, relative to the first stream, of 4 µs;
   transmitting, when there are at least three streams, the precoded portion of the second stream with a cyclic shift delay, relative to the first stream, of 4 µs, and a precoded portion of a third stream with a cyclic shift delay, relative to the first stream, of 1 μs; and transmitting, when there are at least four streams, the precoded portion of the second stream with a cyclic shift delay, relative to the first stream, of 4 μs, the precoded portion of the third stream with a cyclic shift delay, relative to the first stream, of 1 μs, and a precoded portion of a fourth stream with a cyclic shift delay, relative to the first stream, of 5 μs.

2. The method of claim 1, further comprising:

selecting a new cyclic shift delay table for each of the streams, based on one or more of: a stream bandwidth, a frame format, and a transmit antenna;

applying a cyclic shift delay to each stream based on the selected cyclic shift delay table; and transmitting the streams with the applied cyclic shift delay.

3. The method of claim 1, further comprising:

transmitting a first portion of a data unit according to a first cyclic shift delay table; and transmitting a second portion of the data unit according to a second cyclic shift delay table.

4. The method of claim 3, wherein the first portion comprises an omni portion and the second portion comprises a precoded portion.

5. The method of claim 3, wherein the first cyclic shift delay table is determined based on a metric of received power of a short training field divided by received power of a payload.

6. The method of claim 3, wherein the second cyclic shift delay table is determined based on a metric of received power of a short training field divided by received power of a signal field.

7. The method of claim 1, wherein transmitting comprises transmitting with a 1 MHz bandwidth.

8. The method of claim 1, wherein transmitting comprises transmitting a single-segment frame.

9. A wireless device configured to communicate over one or more space-time streams, the device comprising:

a processor configured to determine a cyclic shift delay for each space-time stream;

a memory; and a transmitter configured to:

transmit a precoded portion of a first stream with a bandwidth of 1 MHz or less;

transmit, when there are at least two streams, a precoded portion of a second stream with a cyclic shift delay, relative to the first stream, of 4 μs;

transmit, when there are at least three streams, the precoded portion of the second stream with a cyclic shift delay, relative to the first stream, of 4 μs, and a precoded portion of a third stream with a cyclic shift delay, relative to the first stream, of 1 μs; and transmit, when there are at least four streams, the precoded portion of the second stream with a cyclic shift delay, relative to the first stream, of 4 μs, the precoded portion of the third stream with a cyclic shift delay, relative to the first stream, of 1 μs, and a precoded portion of a fourth stream with a cyclic shift delay, relative to the first stream, of 5 μs.

10. The device of claim 9, wherein:

the processor is further configured to:

select a new cyclic shift delay table for each of the streams, based on one or more of: a stream bandwidth, a frame format, and a transmit antenna; and apply a cyclic shift delay to each stream based on the selected cyclic shift delay table, and the transmitter is further configured to transmit the streams with the applied cyclic shift delay.

11. The device of claim 9, wherein the transmitter is further configured to:

transmit a first portion of a data unit according to a first cyclic shift delay table; and transmit a second portion of the data unit according to a second cyclic shift delay table.

12. The device of claim 11, wherein the first portion comprises an omni portion and the second portion comprises a precoded portion.

13. The device of claim 11, wherein the first cyclic shift delay table is determined based on a metric of received power of a short training field divided by received power of a payload.

14. The device of claim 11, wherein the second cyclic shift delay table is determined based on a metric of received power of a short training field divided by received power of a signal field.

15. The device of claim 9, wherein the transmitter is configured to transmit with a 1 MHz bandwidth.

16. The device of claim 9, wherein the transmitter is configured to transmit a single-segment frame.

17. An apparatus for communicating over one or more space-time streams, comprising:

means for transmitting a precoded portion of a first stream with a bandwidth of 1 MHz or less;

means for transmitting, when there are at least two streams, a precoded portion of a second stream with a cyclic shift delay, relative to the first stream, of 4 μs;

means for transmitting, when there are at least three streams, the precoded portion of the second stream with a cyclic shift delay, relative to the first stream, of 4 μs, and a precoded portion of a third stream with a cyclic shift delay, relative to the first stream, of 1 μs; and means for transmitting, when there are at least four streams, the precoded portion of the second stream with a cyclic shift delay, relative to the first stream, of 4 μs, the precoded portion of the third stream with a cyclic shift delay, relative to the first stream, of 1 μs, and a precoded portion of a fourth stream with a cyclic shift delay, relative to the first stream, of 5 μs.

18. The apparatus of claim 17, further comprising:

means for selecting a new cyclic shift delay table for each of the streams, based on one or more of: a stream bandwidth, a frame format, and a transmit antenna;

means for applying a cyclic shift delay to each stream based on the selected cyclic shift delay table; and means for transmitting the streams with the applied cyclic shift delay.

19. The apparatus of claim 17, further comprising:

means for transmitting a first portion of a data unit according to a first cyclic shift delay table; and means for transmitting a second portion of the data unit according to a second cyclic shift delay table.

20. The apparatus of claim 19, wherein the first portion comprises an omni portion and the second portion comprises a precoded portion.

21. The apparatus of claim 19, wherein the first cyclic shift delay table is determined based on a metric of received power of a short training field divided by received power of a payload.

22. The apparatus of claim 19, wherein the second cyclic shift delay table is determined based on a metric of received power of a short training field divided by received power of a signal field.

23. The apparatus of claim 17, wherein means for transmitting comprises means for transmitting with a 1 MHz bandwidth.

24. The apparatus of claim 17, wherein means for transmitting comprises means for transmitting a single-segment frame.

25. A non-transitory computer-readable medium comprising code that, when executed, causes an apparatus to:
- transmit a precoded portion of a first stream with a bandwidth of 1 MHz or less;
- transmit, when there are at least two streams, a precoded portion of a second stream with a cyclic shift delay, relative to the first stream, of 4 µs;
- transmit, when there are at least three streams, the precoded portion of the second stream with a cyclic shift delay, relative to the first stream, of 4 µs, and a precoded portion of a third stream with a cyclic shift delay, relative to the first stream, of 1 µs; and
- transmit, when there are at least four streams, the precoded portion of the second stream with a cyclic shift delay, relative to the first stream, of 4 µs, the precoded portion of the third stream with a cyclic shift delay, relative to the first stream, of 1 µs, and a precoded portion of a fourth stream with a cyclic shift delay, relative to the first stream, of 5 µs.

26. The medium of claim 25, further comprising code that, when executed, causes the apparatus to:
- select a new cyclic shift delay table for each of the streams, based on one or more of: a stream bandwidth, a frame format, and a transmit antenna;
- apply a cyclic shift delay to each stream based on the selected cyclic shift delay table; and
- transmit the streams with the applied cyclic shift delay.

27. The medium of claim 25, further comprising code that, when executed, causes the apparatus to:
- transmitting a first portion of a data unit according to a first cyclic shift delay table; and
- transmitting a second portion of the data unit according to a second cyclic shift delay table.

28. The medium of claim 27, wherein the first portion comprises an omni portion and the second portion comprises a precoded portion.

29. The medium of claim 27, wherein the first cyclic shift delay table is determined based on a metric of received power of a short training field divided by received power of a payload.

30. The medium of claim 27, wherein the second cyclic shift delay table is determined based on a metric of received power of a short training field divided by received power of a signal field.

31. The medium of claim 25, wherein transmitting comprises transmitting with a 1 MHz bandwidth.

32. The medium of claim 25, wherein transmitting comprises transmitting a single-segment frame.

* * * * *